United States Patent
Stava

(10) Patent No.: US 7,358,459 B2
(45) Date of Patent: *Apr. 15, 2008

(54) ELECTRIC ARC WELDER SYSTEM WITH WAVEFORM PROFILE CONTROL

(75) Inventor: Elliott K. Stava, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/393,634

(22) Filed: Mar. 30, 2006

(65) Prior Publication Data

US 2006/0169684 A1    Aug. 3, 2006

Related U.S. Application Data

(63) Continuation of application No. 10/789,876, filed on Mar. 1, 2004, now Pat. No. 7,053,334.

(51) Int. Cl.
*B23K 9/09*    (2006.01)
(52) U.S. Cl. ................................. 219/130.51
(58) Field of Classification Search ............. 219/130.5, 219/130.51
See application file for complete search history.

(56) References Cited

U.S. PATENT DOCUMENTS

| | | | |
|---|---|---|---|
| 3,424,892 A | 1/1969 | Wilcox | |
| 3,539,765 A | 11/1970 | Duttera et al. | |
| 3,560,702 A | 2/1971 | Arikawa et al. | |
| 3,573,426 A | 4/1971 | Blake et al. | |
| 3,778,589 A | 12/1973 | Smith et al. | |
| 3,787,658 A | 1/1974 | Kammer et al. | |
| 4,020,320 A | 4/1977 | Pijls et al. | |
| 4,072,845 A | 2/1978 | Buckingham et al. | |
| 4,186,293 A | 1/1980 | Gonzalez et al. | |
| 4,246,463 A | 1/1981 | Shutt et al. | |

(Continued)

FOREIGN PATENT DOCUMENTS

EP    1 036 637 A2    9/2000

(Continued)

OTHER PUBLICATIONS

European Search Report, App. No. EP 05 00 8352, The Hague, Sep. 1, 2005, D. Herbreteau.

(Continued)

*Primary Examiner*—Clifford C. Shaw
(74) *Attorney, Agent, or Firm*—Fay Sharpe LLP

(57) ABSTRACT

An electric arc welder for creating a succession of AC waveforms between an electrode and workpiece by a power source comprising an high frequency switching device for creating individual waveforms in the succession of waveforms. Each of the individual waveforms has a profile determined by the magnitude of each of a large number of short current pulses generated at a frequency of at least 18 kHz by a pulse width modulator with the magnitude of the current pulses controlled by a wave shaper. The welder is provided with a profile control network for setting more than one profile parameter selected from the class consisting of frequency, duty cycle, up ramp rate and down ramp rate and a magnitude circuit for adjusting the waveform profile to set total current, voltage and/or power.

20 Claims, 14 Drawing Sheets

U.S. PATENT DOCUMENTS

| | | |
|---|---|---|
| 4,319,124 A | 3/1982 | Johansson |
| 4,427,874 A | 1/1984 | Tabata et al. |
| 4,551,610 A | 11/1985 | Amata |
| 4,717,536 A | 1/1988 | Chai et al. |
| 4,717,807 A | 1/1988 | Parks et al. |
| 4,723,061 A | 2/1988 | Munz et al. |
| 4,794,232 A | 12/1988 | Kimbrough et al. |
| 4,833,296 A | 5/1989 | Crockett et al. |
| 4,866,247 A | 9/1989 | Parks et al. |
| 4,954,691 A | 9/1990 | Parks et al. |
| 5,003,155 A | 3/1991 | Chai et al. |
| 5,015,823 A | 5/1991 | Crockett et al. |
| 5,055,655 A | 10/1991 | Chai et al. |
| 5,091,628 A | 2/1992 | Chai et al. |
| 5,120,931 A | 6/1992 | Kotecki et al. |
| 5,132,514 A | 7/1992 | Chai et al. |
| 5,220,151 A | 6/1993 | Terayami et al. |
| 5,225,660 A | 7/1993 | Mita et al. |
| 5,225,661 A | 7/1993 | Chai et al. |
| 5,233,160 A | 8/1993 | Gordish et al. |
| 5,278,390 A | 1/1994 | Blankenship |
| 5,349,159 A | 9/1994 | Mita et al. |
| 5,365,036 A | 11/1994 | Crockett et al. |
| 5,369,244 A | 11/1994 | Kulikowski et al. |
| 5,676,857 A | 10/1997 | Parker |
| 5,742,029 A | 4/1998 | Stava et al. |
| 5,961,863 A | 10/1999 | Stava |
| 5,981,906 A | 11/1999 | Parker |
| 5,990,445 A | 11/1999 | Ogasawara et al. |
| 6,051,810 A | 4/2000 | Stava |
| 6,091,048 A | 7/2000 | Lanouette et al. |
| 6,093,906 A | 7/2000 | Nicholson et al. |
| 6,111,216 A | 8/2000 | Stava et al. |
| 6,160,241 A | 12/2000 | Stava et al. |
| 6,172,333 B1 | 1/2001 | Stava |
| 6,204,478 B1 | 3/2001 | Nicholson et al. |
| 6,207,929 B1 | 3/2001 | Stava |
| 6,215,100 B1 | 4/2001 | Stava |
| 6,291,798 B1 | 9/2001 | Stava |
| 6,472,634 B1 | 10/2002 | Houston |
| 6,501,049 B2 | 12/2002 | Stava |
| 6,515,259 B1 | 2/2003 | Hsu et al. |
| 6,617,549 B2 | 9/2003 | Ihde |
| 6,717,107 B1 | 4/2004 | Hsu |
| 6,723,954 B2 | 4/2004 | Nikodym et al. |
| 6,723,957 B2 | 4/2004 | Holverson et al. |
| 6,784,401 B2 | 8/2004 | North et al. |
| 7,053,334 B2 * | 5/2006 | Stava .................... 219/130.51 |
| 7,145,101 B2 | 12/2006 | Tong |
| 2002/0030043 A1 | 3/2002 | Tong |
| 2003/0116548 A1 | 6/2003 | Blankenship |
| 2004/0188407 A1 | 9/2004 | Nikodym et al. |
| 2005/0051524 A1 | 3/2005 | Narayanan et al. |
| 2005/0127054 A1 | 6/2005 | Houston et al. |
| 2005/0189334 A1 | 9/2005 | Stava |
| 2006/0226131 A1 * | 10/2006 | Stava et al. ............ 219/130.51 |

FOREIGN PATENT DOCUMENTS

| | | |
|---|---|---|
| EP | 1 595 634 A1 | 11/2005 |
| JP | 53-67657 A | 6/1978 |
| JP | 9-38772 | 2/1997 |

OTHER PUBLICATIONS

Tom De Backer, European Search Report, EP 06 11 7981, Munich, Aug. 29, 2007.

Japanese Office Action in Japanese Application No. 2005-32411, Dec. 4, 2008.

* cited by examiner

ELECTRIC ARC WELDER SYSTEM WITH WAVEFORM PROFILE CONTROL

This application is a continuation of prior U.S. patent application Ser. No. 10/789,876, filed Mar. 1, 2004 now U.S. Pat. No. 7,053,334, entitled "ELECTRIC ARC WELDER SYSTEM WITH WAVEFORM PROFILE CONTROL", by Stava, the disclosure of which is incorporated herein in its entirety, by reference.

The present invention relates to the art of electric arc welding and more particularly to an electric arc welder with waveform profile control.

INCORPORATION BY REFERENCE

The present invention is directed to an electric arc welder system utilizing high capacity alternating circuit power sources for driving two or more tandem electrodes of the type used in seam welding of large metal blanks. It is preferred that the power sources use the switching concept disclosed in Stava U.S. Pat. No. 6,111,216 wherein the power supply is an inverter having two large output polarity switches with the arc current being reduced before the switches reverse the polarity. Consequently, the term "switching point" is a complex procedure whereby the power source is first turned off awaiting a current less than a preselected value, such as 100 amperes. Upon reaching the 100 ampere threshold, the output switches of the power supply are reversed to reverse the polarity from the D.C. output link of the inverter. Thus, the "switching point" is an off output command, known as a "kill" command, to the power supply inverter followed by a switching command to reverse the output polarity. The kill output can be a drop to a decreased current level. This procedure is duplicated at each successive polarity reversal so the AC power source reverses polarity only at a low current. In this manner, snubbing circuits for the output polarity controlling switches are reduced in size or eliminated. Since this switching concept is preferred to define the switching points as used in the present invention, Stava U.S. Pat. No. 6,111,216 is incorporated by reference. The concept of an AC current for tandem electrodes is well known in the art. U.S. Pat. No. 6,207,929 discloses a system whereby tandem electrodes are each powered by a separate inverter type power supply. The frequency is varied to reduce the interference between alternating current in the adjacent tandem electrodes. Indeed, this prior patent of assignee relates to single power sources for driving either a DC powered electrode followed by an AC electrode or two or more AC driven electrodes. In each instance, a separate inverter type power supply is used for each electrode and, in the alternating current high capacity power supplies, the switching point concept of Stava U.S. Pat. No. 6,111,216 is employed. This system for separately driving each of the tandem electrodes by a separate high capacity power supply is background information to the present invention and is incorporated herein as such background. In a like manner, U.S. Pat. No. 6,291,798 discloses a further arc welding system wherein each electrode in a tandem welding operation is driven by two or more independent power supplies connected in parallel with a single electrode arc. The system involves a single set of switches having two or more accurately balanced power supplies forming the input to the polarity reversing switch network operated in accordance with Stava U.S. Pat. No. 6,111,216. Each of the power supplies is driven by a single command signal and, therefore, shares the identical current value combined and directed through the polarity reversing switches. This type system requires large polarity reversing switches since all of the current to the electrode is passed through a single set of switches. U.S. Pat. No. 6,291,798 does show a master and slave combination of power supplies for a single electrode and discloses general background information to which the invention is directed. For that reason, this patent is also incorporated by reference. An improvement for operating tandem electrodes with controlled switching points is disclosed in Houston U.S. Pat. No. 6,472,634. This patent is incorporated by reference.

BACKGROUND OF INVENTION

Welding applications, such as pipe welding, often require high currents and use several arcs created by tandem electrodes. Such welding systems are quite prone to certain inconsistencies caused by arc disturbances due to magnetic interaction between two adjacent tandem electrodes. A system for correcting the disadvantages caused by adjacent AC driven tandem electrodes is disclosed in Stava U.S. Pat. No. 6,207,929. In that prior patent, each of the AC driven electrodes has its own inverter based power supply. The output frequency of each power supply is varied so as to prevent interference between adjacent electrodes. This system requires a separate power supply for each electrode. As the current demand for a given electrode exceeds the current rating of the inverter based power supply, a new power supply must be designed, engineered and manufactured. Thus, such system for operating tandem welding electrodes require high capacity or high rated power supplies to obtain high current as required for pipe welding. To decrease the need for special high current rated power supplies for tandem operated electrodes, assignee developed the system disclosed in Stava U.S. Pat. No. 6,291,798 wherein each AC electrode is driven by two or more inverter power supplies connected in parallel. These parallel power supplies have their output current combined at the input side of a polarity switching network. Thus, as higher currents are required for a given electrode, two or more parallel power supplies are used. In this system, each of the power supplies are operated in unison and share equally the output current. Thus, the current required by changes in the welding conditions can be provided only by the over current rating of a single unit. A current balanced system did allow for the combination of several smaller power supplies; however, the power supplies had to be connected in parallel on the input side of the polarity reversing switching network. As such, large switches were required for each electrode. Consequently, such system overcame the disadvantage of requiring special power supplies for each electrode in a tandem welding operation of the type used in pipe welding; but, there is still the disadvantage that the switches must be quite large and the input, paralleled power supplies must be accurately matched by being driven from a single current command signal. Stava U.S. Pat. No. 6,291,798 does utilize the concept of a synchronizing signal for each welding cell directing current to each tandem electrode. However, the system still required large switches. This type of system was available for operation in an ethernet network interconnecting the welding cells. In ethernet interconnections, the timing cannot be accurately controlled. In the system described, the switch timing for a given electrode need only be shifted on a time basis, but need not be accurately identified for a specific time. Thus, the described system requiring balancing the current and a single switch network has been the manner of obtaining high capacity current for use in tandem arc welding operations when using an ethernet network or an internet and ethernet control system. There is a desire to control welders by an ethernet network, with or without an internet link. Due to timing limitation, these networks dictated use of tandem electrode systems of the type using only general synchronizing techniques.

Such systems could be controlled by a network; however, the parameter to each paralleled power supply could not be varied. Each of the cells could only be offset from each other by a synchronizing signal. Such systems were not suitable for central control by the internet and/or local area network control because an elaborate network to merely provide offset between cells was not advantageous. Houston U.S. Pat. No. 6,472,634 discloses the concept of a single AC arc welding cell for each electrode wherein the cell itself includes one or more paralleled power supplies each of which has its own switching network. The output of the switching network is then combined to drive the electrode. This allows the use of relatively small switches for polarity reversing of the individual power supplies paralleled in the system. In addition, relatively small power supplies can be paralleled to build a high current input to each of several electrodes used in a tandem welding operation. The use of several independently controlled power supplies paralleled after the polarity switch network for driving a single electrode allows advantageous use of a network, such as the internet or ethernet.

In Houston U.S. Pat. No. 6,472,634, smaller power supplies in each system are connected in parallel to power a single electrode. By coordinating switching points of each paralleled power supply with a high accuracy interface, the AC output current is the sum of currents from the paralleled power supplies without combination before the polarity switches. By using this concept, the ethernet network, with or without an internet link, can control the weld parameters of each paralleled power supply of the welding system. The timing of the switch points is accurately controlled by the novel interface, whereas the weld parameters directed to the controller for each power supply can be provided by an ethernet network which has no accurate time basis. Thus, an internet link can be used to direct parameters to the individual power supply controllers of the welding system for driving a single electrode. There is no need for a time based accuracy of these weld parameters coded for each power supply. In the preferred implementation, the switch point is a "kill" command awaiting detection of a current drop below a minimum threshold, such as 100 amperes. When each power supply has a switch command, then they switch. The switch points between parallel power supplies, whether instantaneous or a sequence involving a "kill" command with a wait delay, are coordinated accurately by an interface card having an accuracy of less than 10 µs and preferably in the range of 1-5 µs. This timing accuracy coordinates and matches the switching operation in the paralleled power supplies to coordinate the AC output current.

By using the internet or ethernet local area network, the set of weld parameters for each power supply is available on a less accurate information network, to which the controllers for the paralleled power supplies are interconnected with a high accuracy digital interface card. Thus, the switching of the individual, paralleled power supplies of the system is coordinated. This is an advantage allowing use of the internet and local area network control of a welding system. The information network includes synchronizing signals for initiating several arc welding systems connected to several electrodes in a tandem welding operation in a selected phase relationship. Each of the welding systems of an electrode has individual switch points accurately controlled while the systems are shifted or delayed to prevent magnetic interference between different electrodes. This allows driving of several AC electrodes using a common information network. The Houston U.S. Pat. No. 6,472,634 system is especially useful for paralleled power supplies to power a given electrode with AC current. The switch points are coordinated by an accurate interface and the weld parameter for each paralleled power supply is provided by the general information network. This background is technology developed and patented by assignee and does not necessarily constitute prior art just because it is herein used as "background."

As a feature of the system in Stava U.S. Pat. No. 6,207,929, two or more power supplies can drive a single electrode. Thus, the system comprises a first controller for a first power supply to cause the first power supply to create an AC current between the electrode and workpiece by generating a switch signal with polarity reversing switching points in general timed relationship with respect to a given system synchronizing signal received by the first controller. This first controller is operated at first welding parameters in response to a set of first power supply specific parameter signals directed to the first controller. There is provided at least one slave controller for operating the slave power supply to create an AC current between the same electrode and workpiece by reversing polarity of the AC current at switching points. The slave controller operates at second weld parameters in response to the second set of power supply specific parameter signals to the slave controller. An information network connected to the first controller and the second or slave controller contains digital first and second power supply specific parameter signals for the two controllers and the system specific synchronizing signal. Thus, the controllers receive the parameter signals and the synchronizing signal from the information network, which may be an ethernet network with or without an internet link, or merely a local area network. The invention involves a digital interface connecting the first controller and the slave controller to control the switching points of the second or slave power supply by the switch signal from the first or master controller. In practice, the first controller starts a current reversal at a switch point. This event is transmitted at high accuracy to the slave controller to start its current reversal process. When each controller senses an arc current less than a given number, a "ready signal" is created. After a "ready" signal from all paralleled power supplies, all power supplies reverse polarity. This occurs upon receipt of a strobe or look command each 25 µs. Thus, the switching is in unison and has a delay of less than 25 µs. Consequently, both of the controllers have interconnected data controlling the switching points of the AC current to the single electrode. The same controllers receive parameter information and a synchronizing signal from an information network which in practice comprises a combination of internet and ethernet or a local area ethernet network. The timing accuracy of the digital interface is less than about 10 µs and, preferably, in the general range of 1-5 µs. Thus, the switching points for the two controllers driving a single electrode are commanded within less than 5 µs. Then, switching actually occurs within 25 µs. At the same time, relatively less time sensitive information is received from the information network also connected to the two controllers driving the AC current to a single electrode in a tandem welding operation. The 25 µs maximum delay can be changed, but is less than the switch command accuracy.

The unique control system disclosed in Houston U.S. Pat. No. 6,472,634 is used to control the power supply for tandem electrodes used primarily in pipe seam welding and disclosed in Stava U.S. Pat. No. 6,291,798. This Stava patent relates to a series of tandem electrodes movable along a welding path to lay successive welding beads in the space between the edges of a rolled pipe or the ends of two adjacent pipe sections. The individual AC waveforms used in this unique technology are created by a number of current pulses occurring at a frequency of at least 18 kHz with a magnitude of each current pulse controlled by a wave shaper. This technology dates back to Blankenship U.S. Pat. No. 5,278,390. Shaping of the waveforms in the AC currents of two adjacent tandem electrodes is known and is shown in not only the patents mentioned above, but in Stava U.S. Pat. No. 6,207,929. In this latter Stava patent, the frequency of the AC current at adjacent tandem electrodes is adjusted to prevent magnetic interference. All of these patented technologies by The Lincoln Electric Company of Cleveland, Ohio have been advances in the operation of tandem electrodes each of which is operated by a separate AC waveform created by the waveform technology set forth in these patents. These patents are incorporated by reference herein. However, these patents do not disclose the present invention which is directed to the use of such waveform-technology for use in tandem welding by adjacent electrodes each using an AC current. This technology, as the normal transformer technology, has experienced difficulty in controlling the dynamics of the weld puddle. Thus, there is a need for an electric arc welding system for adjacent tandem electrodes which is specifically designed to control the dynamics and physics of the molten weld puddle during the welding operation. These advantages can not be obtained by merely changing the frequency to reduce the magnetic interference.

THE INVENTION

The present invention relates to an improvement in the waveform technology disclosed in Blankenship U.S. Pat. No. 5,278,390 and used for tandem electrode welding systems by several patents, including Stava U.S. Pat. No. 6,207,929; Stava U.S. Pat. No. 6,291,798; and, Houston U.S. Pat. No. 6,472,634. The improvement over this well developed technology is to control on a real time basis the individual AC waveforms generated between the electrode and workpiece which waveforms in succession constitute the welding process. By using the present invention each individual waveform in the AC welding process is controlled in a unique manner that adjusts several profile parameters and also the energy profile of the individual sections of the waveform. In this manner, various welding currents and/or voltage waveforms can be used to effect the overall welding process in a unique manner that accurately controls the process using waveform technology of the type pioneered by The Lincoln Electric Company of Cleveland, Ohio. By using the present invention, the welding process can be controlled to effect several characteristics such as penetration into the base metal, the melt off rate of the electrode, the heat input into the base metal, and the welding travel speed as well as the wire feed speed. In addition, various arc welding current and/or arc welding voltage waveforms can be generated to essentially "paint" a desired waveform to effect the mechanical and metallurgical properties of the "as welded" weld metal resulting from the welding process. The invention controls the general profile of a waveform which means the parameters defining the profile are controlled. Then the energy or power of the profile controlled waveform can be adjusted without changing the general profile which is fixed. When combining various welding waveforms, sometimes called wave shapes, with specific electrodes, an improvement in the welding process both in welding speed and improved mechanical metallurgical properties is obtained. The types of electrode that are combined with the unique profile controlled waveforms are solid wires normally used for low carbon steel, solid wires of various alloys such as, but not limited to, nickel and chrome for welding stainless steel and other similar alloys, aluminum electrodes and cored electrodes including internal flux and metal alloys. By selecting the desired welding wire and then using the present invention to "paint" the exactly controlled general profile of an individual waveform in a succession of waveforms constituting the welding process, the welder using the present invention can produce heretofore unobtainable weld results.

In the past, the ability to use SCR welders to produce AC waveforms of accurately and varied shapes is technically difficult, if not impossible. The present invention utilizes the high frequency waveform technology using an inverter or an equivalent chopper and/or design, which designs have the capacity of generating virtually any waveform profile. The waveform profile of successive waveforms in an AC welding process usually involves producing current pulses at a rate exceeding 18 kHz to enable the generation of a waveform by adding or subtracting small amounts of energy. The present invention uses this technology by controlling the general profile of individual waveforms. The invention produces an AC waveform with a controlled profile, whereas normally such technology was used to produce DC or pulse DC waveforms. When the technology was used before to create AC waveforms, the waveforms were fixed and normally square wave. Such square waves were normally not imbalanced AC waveforms because the control concept was not directed to profile parameters, but to pulse wave magnitude. The present invention provides an improvement to a welder using high switching speed waveform technology which improvement allows the individual waveforms to be created in virtually any desired profile by controlling a set of profile parameters. In this manner, the exact general profile of a waveform can be combined with the precise welding electrode or wire to produce the desired welding characteristics of a welding process, particularly an automatic weld process such as implemented by a robotic cell. The profile is combined with a magnitude circuit to change magnitude to adjust heat while holding the exact set general profile.

In accordance with the present invention there is provided an electric arc welder for creating a succession of AC waveforms between an electrode and a workpiece by a power source comprising an high frequency switching device such as an inverter or its equivalent chopper for creating individual waveforms in the succession of waveforms constituting the welding process. Each of the individual waveforms has a precise general profile determined by the magnitude of each of a large number of short current pulses generated at a frequency of at least 18 kHz by a pulse width modulator with the magnitude of the current pulses controlled by a wave shaper. The polarity of any portion of the individual AC waveform is determined by the data of a polarity signal. A profile control network is used for establishing the general profile of an individual waveform by setting more than one profile parameter of the individual waveform. The parameters are selected from the class consisting of frequency, duty cycle, up ramp rate and down ramp rate. Also included in the welder control is a magnitude circuit for adjusting the individual waveform profile to set total current, voltage and/or power for the waveform without substantially changing the set general profile. This concept of the invention is normally accomplished in two sections where the energy is controlled in the positive polarity and in the negative polarity of the generated waveform profile. In accordance with another aspect of the present invention there is provided a method of electric arc welding by creating a succession of AC waveforms between an electrode and a workpiece by a power source comprising an high frequency switching device for creating individual waveforms in the succession of waveforms constituting the weld process. Each of the individual waveforms has profile determined by the magnitude of each of a large number of short current pulses generated at a frequency of at least 18 kHz by a pulse width modulator with the magnitude of the current pulses controlled by a wave shaper. The method comprises determining the plurality of any portion of the individual waveform by the data of a plurality signal, establishing the general profile of an individual waveform by setting more than one profile parameter of an individual waveform, said parameters selected from the class consisting of frequency, duty cycle, up ramp rate and down ramp rate and adjusting the waveform to set the total magnitude of current, voltage and/or power without substantially changing the set profile.

The primary object of the present invention is the provision of an electric arc welder using waveform technology wherein the general profile of the individual waveforms constituting the AC welding process is accurately controlled to a given profile that will precisely perform a welding process with desired physical and metallurgical characteristics.

Another object of the present invention is the provision of an electric arc welder, as defined above, which electric arc welder generates a precise controllable and changeable general profile for the waveform of an AC welding process to thereby adjust the weld speed, deposition rate, heat input, mechanical and metallurgical properties and related characteristics to improve the quality and performance of the welding process.

Yet another object of the present invention is the provision of an electric arc welder, as defined above, which electric arc welder simultaneously adjusts more than one profile parameter of an individual waveform where the parameters are selected from the class consisting of frequency, duty cycle, up ramp rate and down ramp rate.

Still a further object of the present invention is the provision of an electric arc welder, as defined above, which electric arc welder includes a magnitude circuit control for adjusting the individual waveform profile to set total current voltage and/or power for each of the polarity portions of the waveform constituting the AC welding process without substantially changing the set waveform profile.

Yet another object of the present invention is the provision of a method for arc welding that creates a succession of AC waveforms between an electrode and workpiece, which method accurately and interactively sets the general profile of the individual waveform constituting the AC welding process.

These and other objects and advantages will become apparent from the following description taken together with the accompanying drawings.

PREFERRED EMBODIMENT

Figure 15:
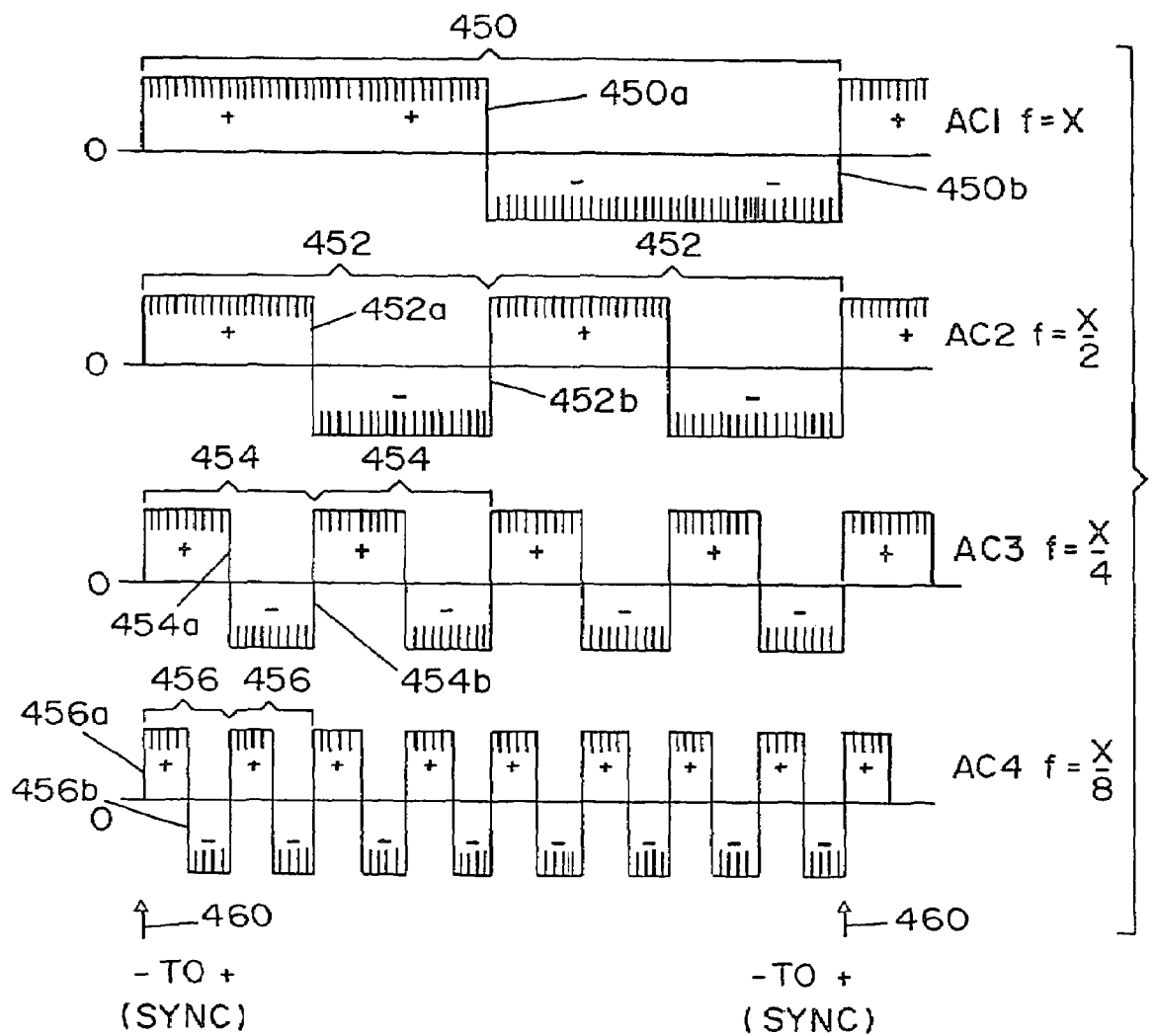
FIG. 15 are current graphs showing waveforms at four adjacent AC arcs of tandem electrodes shaped and synchronized in accordance with a background aspect of the invention.
Figure 16:
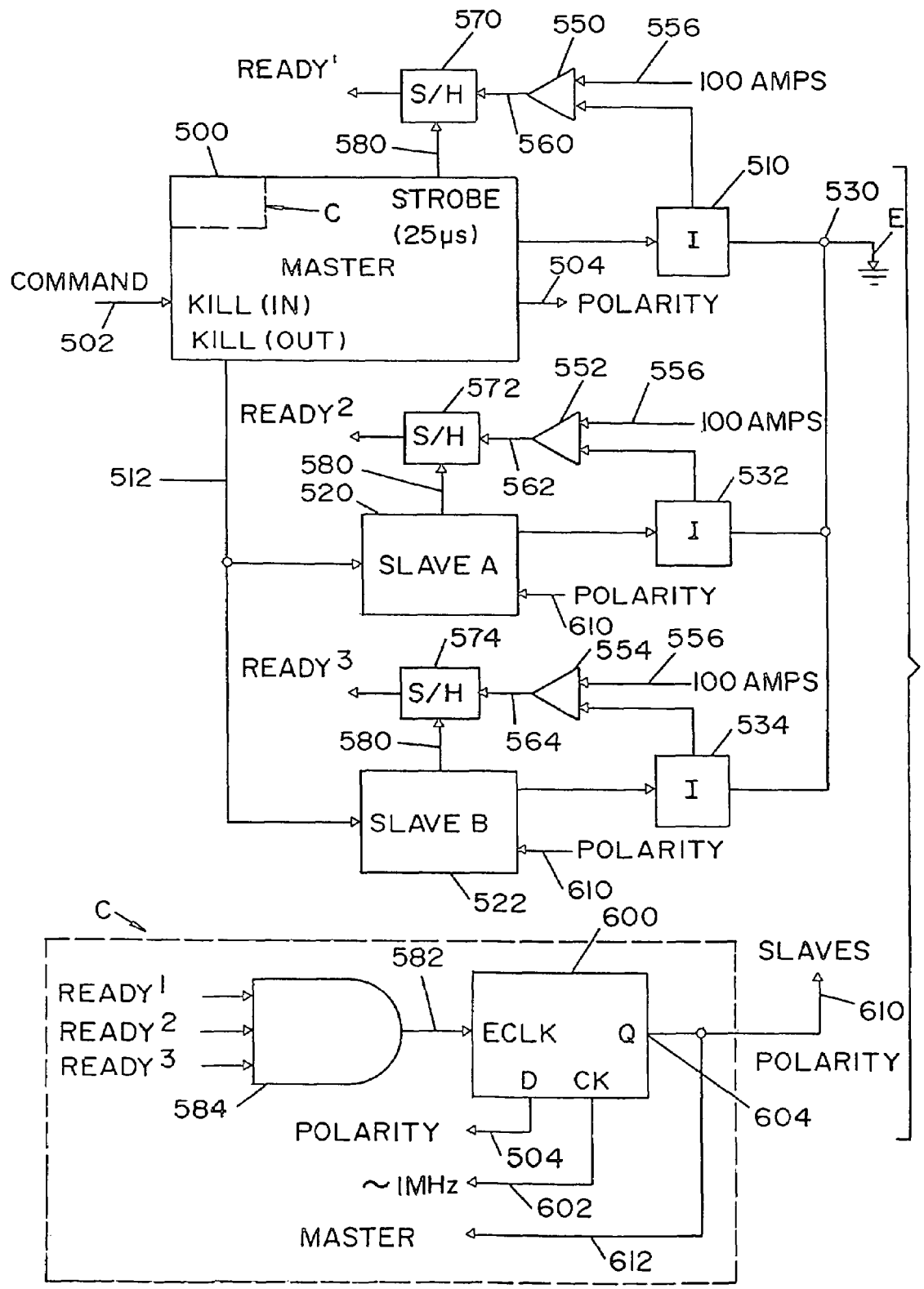
FIG. 16 is a schematic layout of a known software program to cause switching of the paralleled power supplies as soon as the coordinated switch commands have been processed and the next coincident signal has been created.
Figure 17:
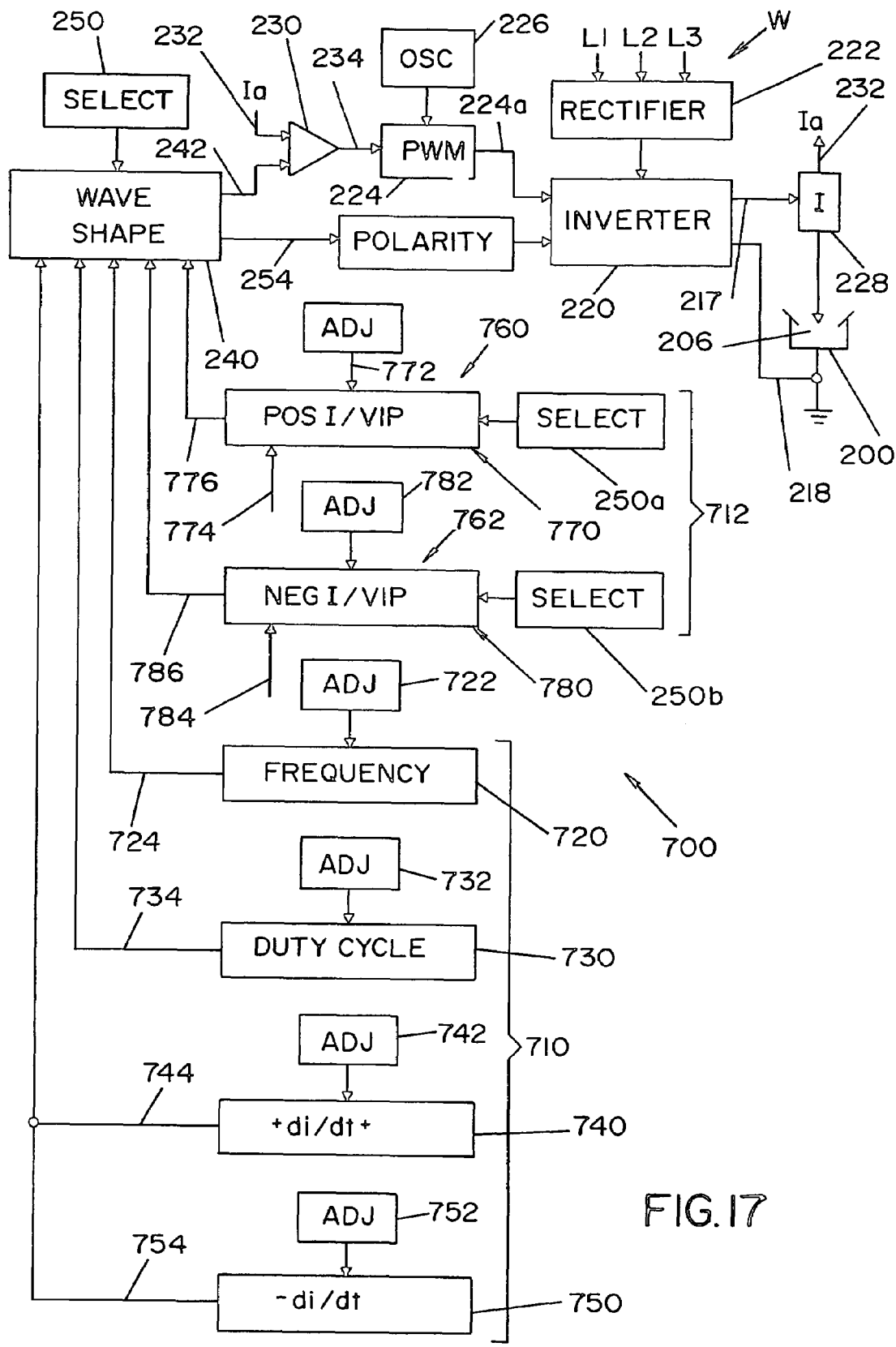
FIG. 17 is a block diagram of the program used in the computer controller to improve the background system shown in FIGS. 1-16 so a welder performs in accordance with the preferred embodiment of the present invention; and, FIG. 18 is a schematically illustrated waveform used in explaining the implementation of the present invention.
Figure 18:
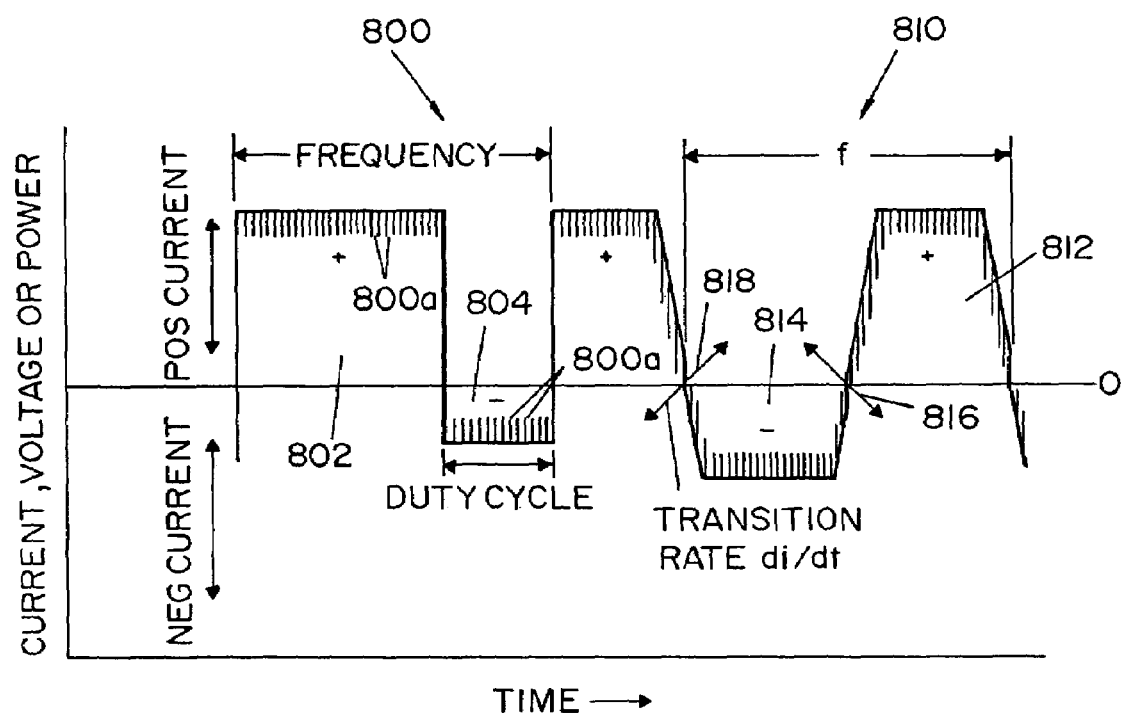

Referring now to the drawings wherein the showings are for the purpose of illustrating a preferred embodiment of the invention only and not for the purpose of limiting same, a background system for implementing the invention is shown in detail in FIGS. 1, 2, 4, 5 and 16. FIGS. 2 and 6-15 describe prior attributes of the disclosed background welding systems. The improvement of this invention is shown in FIGS. 17 and 18.

Figure 1:
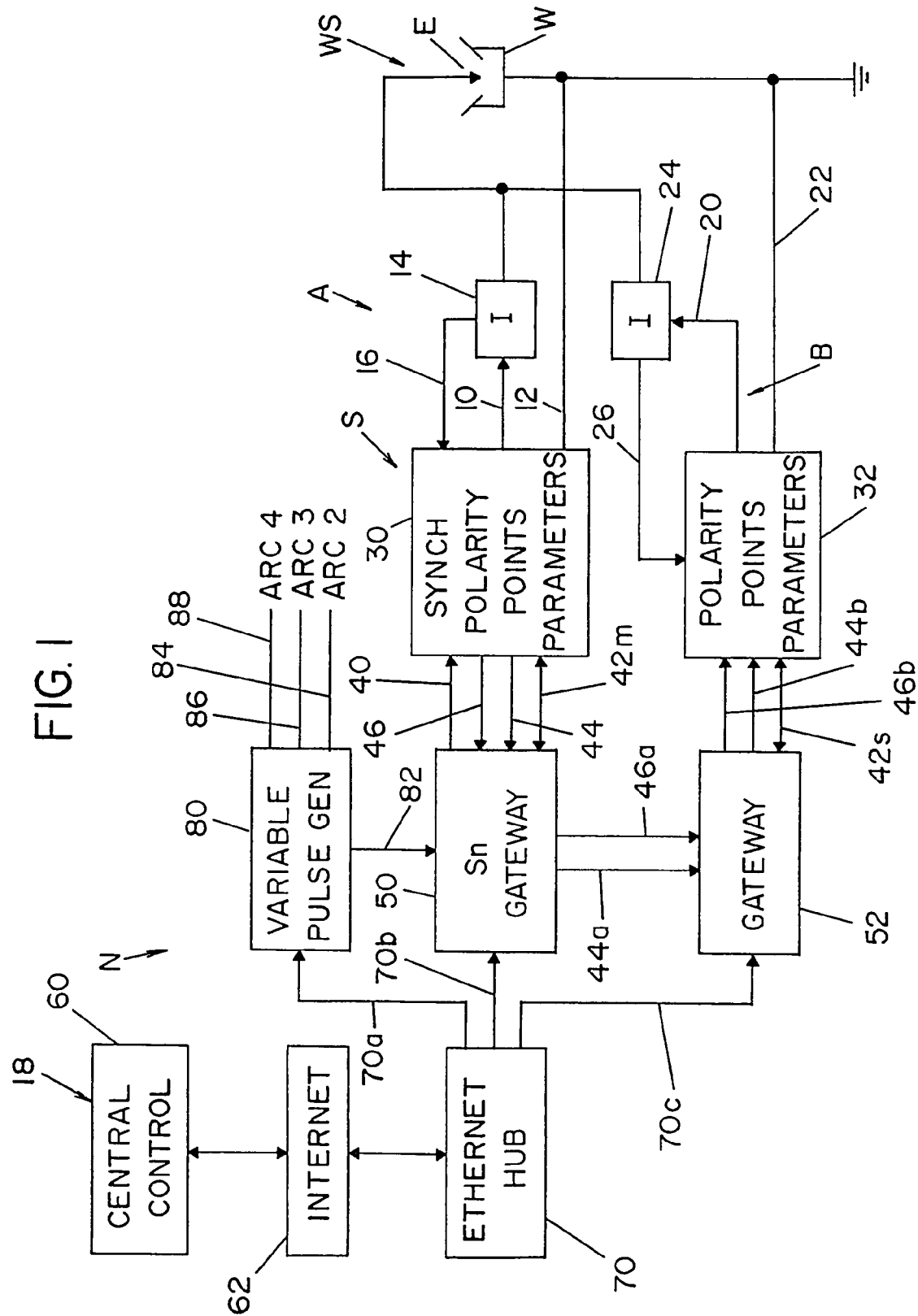
FIG. 1 is a block diagram of a welding system that can be used to perform the present invention.
Figure 5:
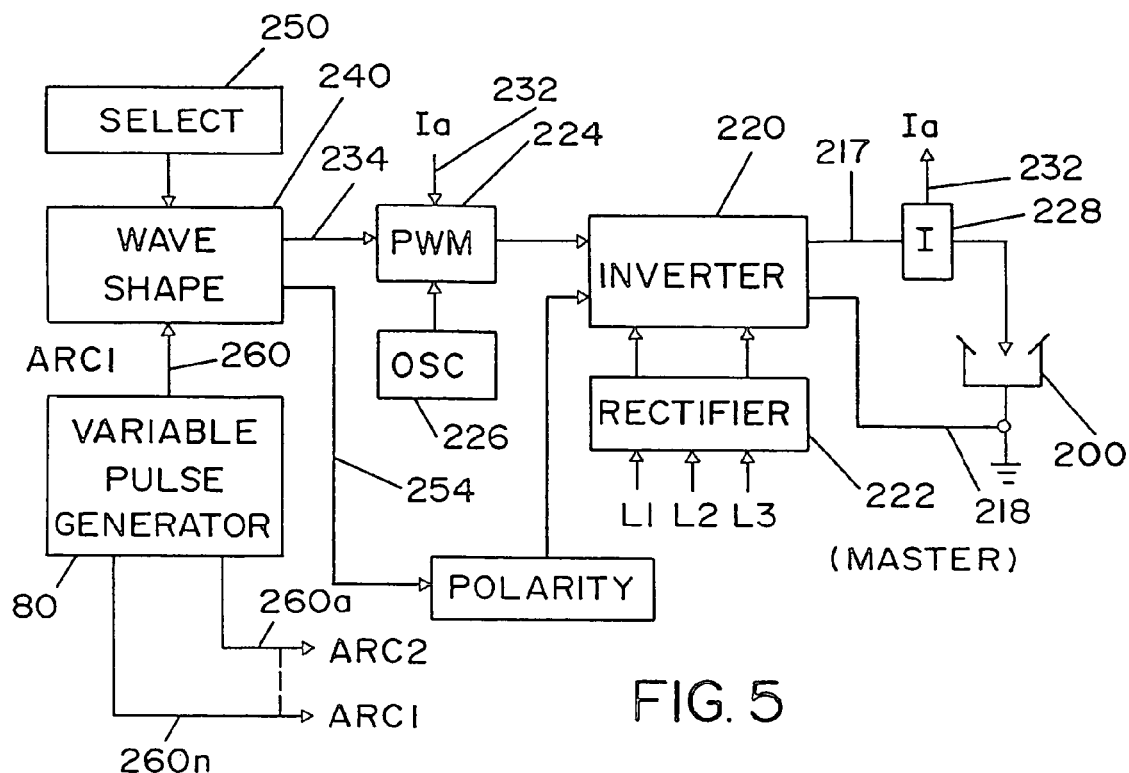
FIG. 5 is a block diagram showing a single electrode driven by the system as shown in FIG. 4 with a variable pulse generator disclosed in Houston U.S. Pat. No. 6,472,634 and used for practicing the present invention.

Turning now to the background system to which the present invention is an improvement and/or an enhancement, FIG. 1 discloses a single electric arc welding system S in the form of a single cell to create an alternating current as an arc at weld station WS. This system or cell includes a first master welder A with output leads 10, 12 in series with electrode E and workpiece W in the form of a pipe seam joint or other welding operation. Hall effect current transducer 14 provides a voltage in line 16 proportional to the current of welder A. Less time critical data, such as welding parameters, are generated at a remote central control 18. In a like manner, a slave following welder B includes leads 20, 22 connected in parallel with leads 10, 12 to direct an additional AC current to the weld station WS. Hall effect current transducer 24 creates a voltage in line 26 representing current levels in welder B during the welding operation. Even though a single slave or follower welder B is shown, any number of additional welders can be connected in parallel with master welder A to produce an alternating current across electrode E and workpiece W. The AC current is combined at the weld station instead of prior to a polarity switching network. Each welder includes a controller and inverter based power supply illustrated as a combined master controller and power supply 30 and a slave controller and power supply 32. Controllers 30, 32 receive parameter data and synchronization data from a relatively low level logic network. The parameter information or data is power supply specific whereby each of the power supplies is provided with the desired parameters such as current, voltage and/or wire feed speed. A low level digital network can provide the parameter information; however, the AC current for polarity reversal occurs at the same time. The "same" time indicates a time difference of less than 10 µs and preferably in the general range of 1-5 µs. To accomplish precise coordination of the AC output from power supply 30 and power supply 32, the switching points and polarity information can not be provided from a general logic network wherein the timing is less precise. The individual AC power supplies are coordinated by high speed, highly accurate DC logic interface referred to as "gateways." As shown in FIG. 1, power supplies 30, 32 are provided with the necessary operating parameters indicated by the bi-directional leads 42*m*, 42*s*, respectively. This non-time sensitive information is provided by a digital network shown in FIG. 1. Master power supply 30 receives a synchronizing signal as indicated by unidirectional line 40 to time the controllers operation of its AC output current. The polarity of the AC current for power supply 30 is outputted as indicated by line 46. The actual switching command for the AC current of master power supply 30 is outputted on line 44. The switch command tells power supply S, in the form of an inverter, to "kill," which is a drastic reduction of current. In an alternative, this is actually a switch signal to reverse polarity. The "switching points" or command on line 44 preferably is a "kill" and current reversal commands utilizing the "switching points" as set forth in Stava U.S. Pat. No. 6,111,216. Thus, timed switching points or commands are outputted from power supply 30 by line 44. These switching points or commands may involve a power supply "kill" followed by a switch ready signal at a low current or merely a current reversal point. The switch "ready" is used when the "kill" concept is implemented because neither inverters are to actually reverse until they are below the set current. This is described in FIG. 16. The polarity of the switches of controller 30 controls the logic on line 46. Slave power supply 32 receives the switching point or command logic on line 44*b* and the polarity logic on line 46*b*. These two logic signals are interconnected between the master power supply and the slave power supply through the highly accurate logic interface shown as gateway 50, the transmitting gateway, and gateway 52, the receiving gateway. These gateways are network interface cards for each of the power supplies so that the logic on lines 44*b*, 46*b* are timed closely to the logic on lines 44, 46, respectively. In practice, network interface cards or gateways 50, 52 control this logic to within 10 µs and preferably within 1-5 µs. A low accuracy network controls the individual power supplies for data from central control 18 through lines 42*m*, 42*s*, illustrated as provided by the gateways or interface cards. These lines contain data from remote areas (such as central control 18) which are not time sensitive and do not use the accuracy characteristics of the gateways. The highly accurate data for timing the switch reversal uses interconnecting logic signals through network interface cards 50, 52. The system in FIG. 1 is a single cell for a single AC arc; however, the invention is not limited to tandem electrodes wherein two or more AC arcs are created to fill the large gap found in pipe welding. However, the background system is shown for this application. Thus, the master power supply 30 for the first electrode receives a synchronization signal which determines the timing or phase operation of the system S for a first electrode, i.e. ARC 1. System S is used with other identical systems to generate ARCs 2, 3, and 4 timed by synchronizing outputs 84, 86 and 88. This concept is schematically illustrated in FIG. 5. The synchronizing or phase setting signals 82-88 are shown in FIG. 1 with only one of the tandem electrodes. An information network N comprising a central control computer and/or web server 60 provides digital information or data relating to specific power supplies in several systems or cells controlling different electrodes in a tandem operation. Internet information is directed to a local area network in the form of an ethernet network 70 having local interconnecting lines 70*a*, 70*b*, 70*c*. Similar interconnecting lines are directed to each power supply used in the four cells creating ARCs 1, 2, 3 and 4 of a tandem welding operation. The description of system or cell S applies to each of the arcs at the other electrodes. If AC current is employed, a master power supply is used. In some instances, merely a master power supply is used with a cell specific synchronizing signal. If higher currents are required, the systems or cells include a master and slave power supply combination as described with respect to system S of FIG. 1. In some instances, a DC arc is used with two or more AC arcs synchronized by generator 80. Often the DC arc is the leading electrode in a tandem electrode welding operation, followed by two or more synchronized AC arcs. A DC power supply need not be synchronized, nor is there a need for accurate interconnection of the polarity logic and switching points or commands. Some DC powered electrodes may be switched between positive and negative, but not at the frequency of an AC driven electrode. Irrespective of the make-up of the arcs, ethernet or local area network 70 includes the parameter information identified in a coded fashion designated for specific power supplies of the various systems used in the tandem welding operation. This network also employs synchronizing signals for the several cells or systems whereby the systems can be offset in a time relationship. These synchronizing signals are decoded and received by a master power supply as indicated by line 40 in FIG. 1. In this manner, the AC arcs are offset on a time basis. These synchronizing signals are not required to be as accurate as the switching points through network interface cards or gateways 50, 52. Synchronizing signals on the data network are received by a network interface in the form of a variable pulse generator 80. The generator creates offset synchronizing signals in lines 84, 86 and 88. These synchronizing signals dictate the phase of the individual alternating current cells for separate electrodes in the tandem operation. Synchronizing signals can be generated by interface 80 or actually received by the generator through the network 70. Network 70 merely activates generator 80 to create the delay pattern for the many synchronizing signals. Also, generator 80 can vary the frequency of the individual cells by frequency of the synchronizing pulses if that feature is desired in the tandem welding operation.

Figure 2:
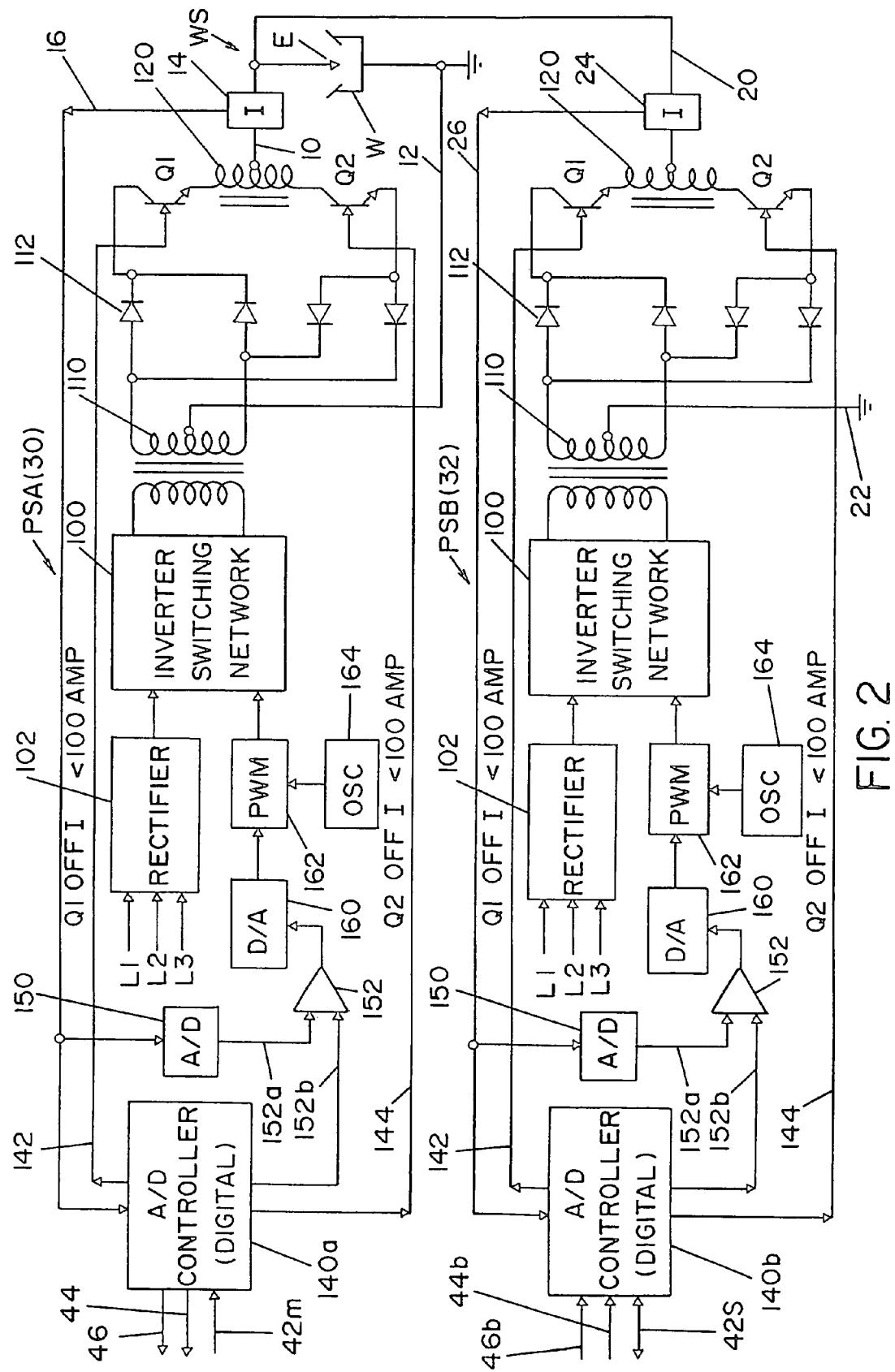
FIG. 2 is a wiring diagram of two paralleled power sources, each of which include a switching output and can be used in practicing the invention.

A variety of controllers and power supplies could be used for practicing the system as described in FIG. 1; however, preferred implementation of the system is set forth in FIG. 2 wherein power supply PSA is combined with controller and power supply 30 and power supply PSB is combined with controller and power supply 32. These two units are essentially the same in structure and are labeled with the same numbers when appropriate. Description of power supply PSA applies equally to power supply PSB. Inverter 100 has an input rectifier 102 for receiving three phase line current L1, L2, and L3. Output transformer 110 is connected through an output rectifier 112 to tapped inductor 120 for driving opposite polarity switches Q1, Q2. Controller 140a of power supply PSA and controller 140b of PSB are essentially the same, except controller 140a outputs timing information to controller 140b. Switching points or lines 142, 144 control the conductive condition of polarity switches Q1, Q2 for reversing polarity at the time indicated by the logic on lines 142, 144, as explained in more detail in Stava U.S. Pat. No. 6,111,216 incorporated by reference herein. The control is digital with a logic processor; thus, A/D converter 150 converts the current information on feedback line 16 or line 26 to controlling digital values for the level of output from error amplifier 152 which is illustrated as an analog error amplifier. In practice, this is a digital system and there is no further analog signal in the control architecture. As illustrated, however, amplifier has a first input 152a from converter 150 and a second input 152b from controller 140a or 140b. The current command signal on line 152b includes the wave shape or waveform required for the AC current across the arc at weld station WS. This is standard practice as taught by several patents of Lincoln Electric, such as Blankenship U.S. Pat. No. 5,278,390, incorporated by reference. See also Stava U.S. Pat. No. 6,207,929, incorporated by reference. The output from amplifier 152 is converted to an analog voltage signal by converter 160 to drive pulse width modulator 162 at a frequency controlled by oscillator 164, which is a timer program in the processor software. The shape of the waveform at the arcs is the voltage or digital number at lines 152b. The frequency of oscillator 164 is greater than 18 kHz. The total architecture of this system is digitized in the preferred embodiment of the present invention and does not include reconversion back into analog signal. This representation is schematic for illustrative purposes and is not intended to be limiting of the type of power supply used in practicing the present invention. Other power supplies could be employed.

Figure 3:
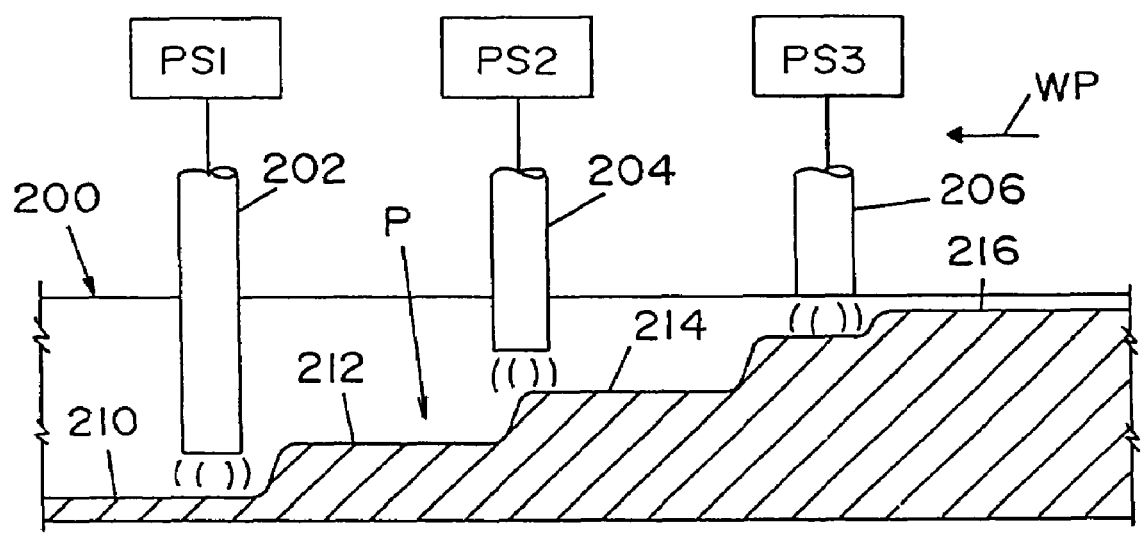
FIG. 3 is a cross sectional side view of three tandem electrodes of the type controllable by the power source disclosed in FIGS. 1 and 2.
Figure 4:
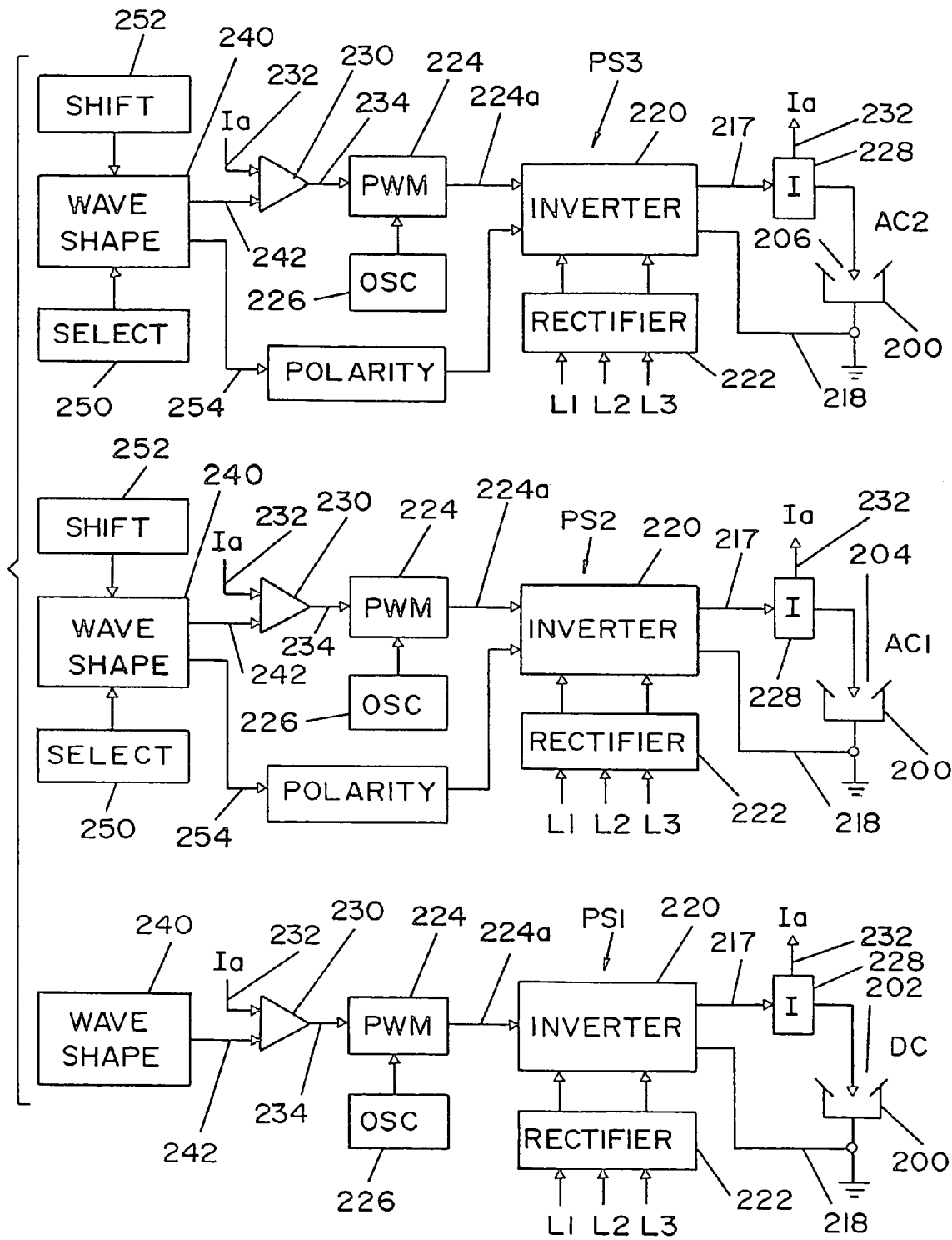
FIG. 4 is a schematic layout in block form of a welding system for three electrodes using the disclosure in Houston U.S. Pat. No. 6,472,634 and Stava U.S. Pat. No. 6,291,798 and where one of the three power sources is used in practicing the invention as shown in FIGS. 17 and 18.
Figure 7:
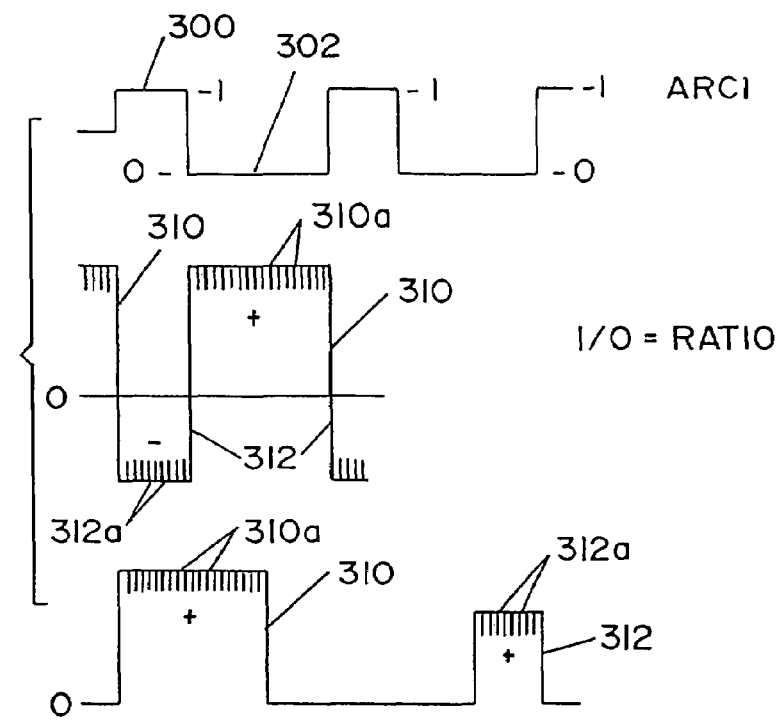
FIG. 7 is a current graph superimposed upon a polarity signal having logic to determine the polarity of the waveform as used in a welder that can practice the present invention.

A background system utilizing the concepts of FIGS. 1 and 2 are illustrated in FIGS. 3 and 4. Workpiece 200 is a seam in a pipe which is welded together by tandem electrodes 202, 204 and 206 powered by individual power supplies PS1, PS2, PS3, respectively. The power supplies can include more than one power source coordinated in accordance with the technology in Houston U.S. Pat. No. 6,472,634. The illustrated embodiment involves a DC arc for lead electrode 202 and an AC arc for each of the tandem electrodes 204, 206. The created waveforms of the tandem electrodes are AC currents and include shapes created by a wave shaper or wave generator in accordance with the previously described waveform technology. As electrodes 202, 204 and 206 are moved along weld path WP a molten metal puddle P is deposited in pipe seam 200 with an open root portion 210 followed by deposits 212, 214 and 216 from electrodes 202, 204 and 206, respectively. As previously described more than two AC driven electrodes as will be described and illustrated by the waveforms of FIG. 15, can be operated by the invention relating to AC currents of adjacent electrodes. The power supplies, as shown in FIG. 4, each include an inverter 220 receiving a DC link from rectifier 222. In accordance with Lincoln waveform technology, a chip or internal programmed pulse width modulator stage 224 is driven by an oscillator 226 at a frequency greater than 18 kHz and preferably greater than 20 kHz. As oscillator 226 drives pulse width modulator 224, the output current has a shape dictated by the wave shape outputted from wave shaper 240 as a voltage or digital numbers at line 242. The shape in real time is compared with the actual arc current in line 232 by a stage illustrated as comparator 230 so that the outputs on line 234 controls the shape of the AC waveforms. The digital number or voltage on line 234 determines the output signal on line 224a to control inverter 220 so that the waveform of the current at the arc follows the selected profile outputted from wave shaper 240. This is standard Lincoln waveform technology, as previously discussed. Power supply PS1 creates a DC arc at lead electrode 202; therefore, the output from wave shaper 240 of this power supply is a steady state indicating the magnitude of the DC current. The present invention does not relate to the formation of a DC arc. To the contrary, the present invention is the control of the current at two adjacent AC arcs for tandem electrodes, such as electrodes 204, 206. In accordance with the invention, wave shaper 240 involves an input 250 employed to select the desired shape or profile of the AC waveform. This shape can be shifted in real time by an internal programming schematically represented as shift program 252. Wave shaper 240 has an output which is a priority signal on line 254. In practice, the priority signal is a bit of logic, as shown in FIG. 7. Logic 1 indicates a negative polarity for the waveform generated by wave shaper 240 and logic 0 indicates a positive polarity. This logic signal or bit controller 220 directed to the power supply is read in accordance with the technology discussed in FIG. 16. The inverter switches from a positive polarity to a negative polarity, or the reverse, at a specific "READY" time initiated by a change of the logic bit on line 254. In practice, this bit is received from variable pulse generator 80 shown in FIG. 1 and in FIG. 5. The background welding system shown in FIGS. 3 and 4 uses the shapes of AC arc currents at electrodes 204 and 206 to obtain a beneficial result, i.e. a generally quiescent molten metal puddle P and/or synthesized sinusoidal waveforms compatible with transformer waveforms used in arc welding. The electric arc welding system shown in FIGS. 3 and 4 have a program to select the waveform at "SELECT" program 250 for wave shaper 240. The unique waveforms are used by the tandem electrodes. One of the power supplies to create an AC arc is schematically illustrated in FIG. 5. The power supply or source is controlled by variable pulse generator 80, shown in FIG. 1. Signal 260 from the generator controls the power supply for the first arc. This signal includes the synchronization of the waveform together with the polarity bit outputted by the wave shaper 240 on line 254. Lines 260a-260n control the desired subsequent tandem AC arcs operated by the welding system of the present invention. The timing of these signals shifts the start of the other waveforms. FIG. 5 merely shows the relationship of variable pulse generator 80 to control the successive arcs as explained in connection with FIG. 4.

Figure 6:
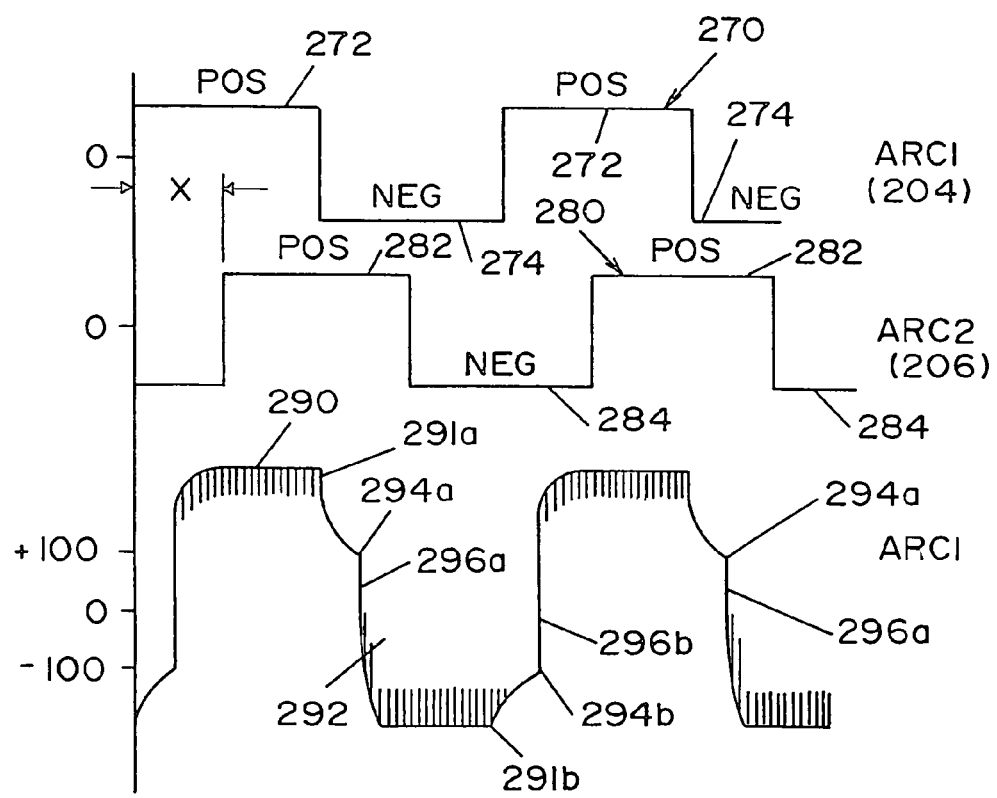
FIG. 6 is a current graph for one of two illustrated synchronizing pulses and showing a balanced AC waveform for one tandem electrode.
Figure 8:
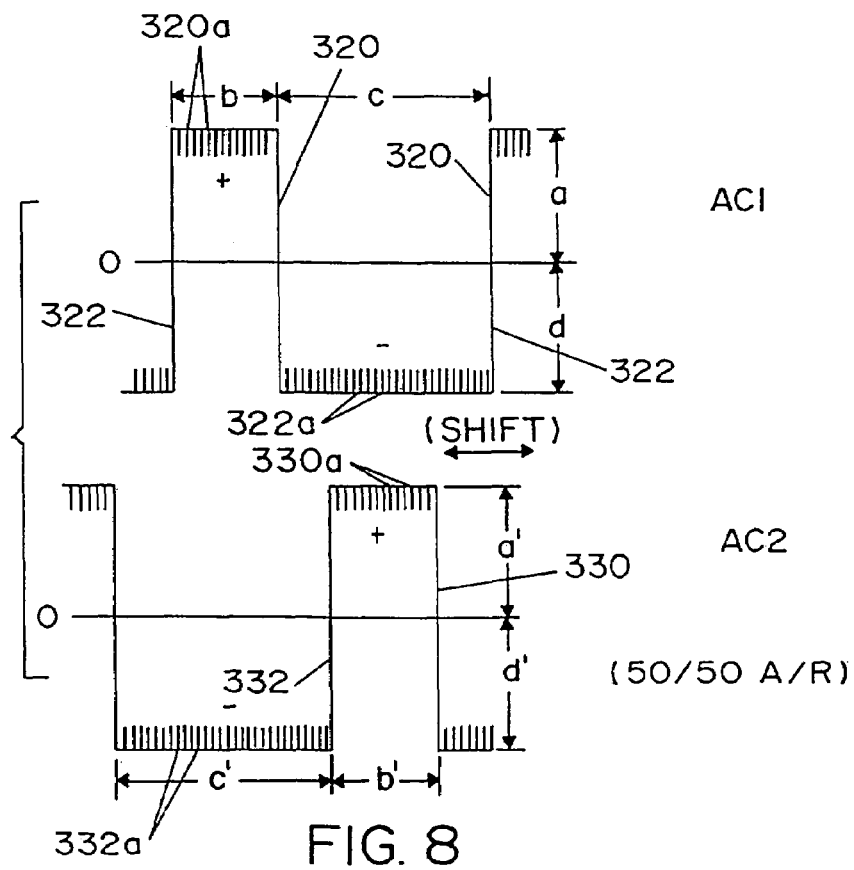
FIG. 8 is a current graph showing a broad aspect of a waveform with a profile controllable by the present invention.
Figure 9:
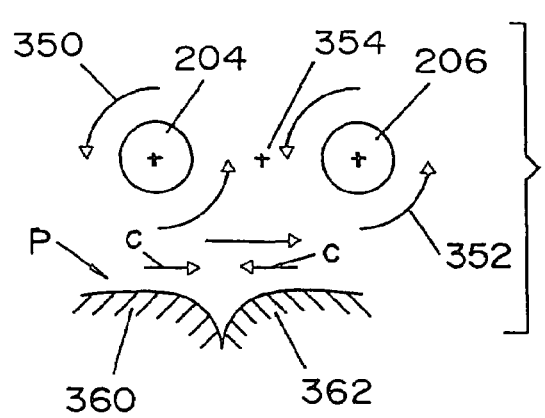
FIGS. 9 and 10 are schematic drawings illustrating the dynamics of the weld puddle during concurrent polarity relationships of tandem electrodes.
Figure 10:
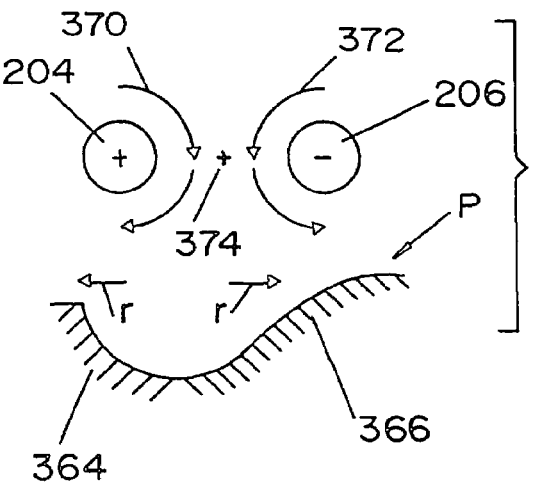

In the welding system of Houston U.S. Pat. No. 6,472,634, the AC waveforms are created as shown in FIG. 6 wherein the wave shaper for arc AC1 at electrode 204 creates a signal 270 having positive portions 272 and negative portions 274. The second arc AC2 at electrode 206 is controlled by signal 280 from the wave shaper having positive portions 282 and negative portions 284. These two signals are the same, but are shifted by the signal from generator 80 a distance x, as shown in FIG. 6. The waveform technology created current pulses or waveforms at one of the arcs are waveforms having positive portions 290 and negative portions 292 shown at the bottom portion of FIG. 6. A logic bit from the wave shaper determines when the waveform is switched from the positive polarity to the negative polarity and the reverse. In accordance with the disclosure in Stava U.S. Pat. No. 6,111,216 (incorporated by reference herein) pulse width modulator 224 is generally shifted to a lower level at point 291a and 291b. Then the current reduces until reaching a fixed level, such as 100 amps. Consequently, the switches change polarity at points 294a and 294b. This produces a vertical line or shape 296a, 296b when current transitioning between positive portion 290 and negative portion 292. This is the system disclosed in the Houston patent where the like waveforms are shifted to avoid magnetic interference. The waveform portions 290, 292 are the same at arc AC1 and at arc AC2. This is different from the present invention which relates to customizing the waveforms at arc AC1 and arc AC2 for purposes of controlling the molten metal puddle and/or synthesizing a sinusoidal wave shape in a manner not heretofore employed. The disclosure of FIG. 6 is set forth to show the concept of shifting the waveforms. The same switching procedure to create a vertical transition between polarities is used in the preferred embodiment of the present invention. Converting from the welding system shown in FIG. 6 to an imbalance waveform is generally shown in FIG. 7. The logic on line 254 is illustrated as being a logic 1 in portions 300 and a logic 0 in portions 302. The change of the logic or bit numbers signals the time when the system illustrated in FIG. 16 shifts polarity. This is schematically illustrated in the lower graph of FIG. 6 at points 294a, 294b. Wave shaper 240 for each of the adjacent AC arcs has a first wave shape 310 for one of the polarities and a second wave shape 312 for the other polarity. Each of the waveforms 310, 312 are created by the logic on line 234 taken together with the logic on line 254. Thus, pulses 310, 312 as shown in FIG. 7, are different pulses for the positive and negative polarity portions. Each of the pulses 310, 312 are created by separate and distinct current pulses 310a, 312a as shown. Switching between polarities is accomplished as illustrated in FIG. 6 where the waveforms generated by the wave shaper are shown as having the general shape of waveforms 310, 312. Positive polarity controls penetration and negative polarity controls deposition. The positive and negative pulses of a waveform are different and the switching points are controlled so that the AC waveform at one arc is controlled both in the negative polarity and the positive polarity to have a specific shape created by the output of wave shaper 240. The waveforms for the arc adjacent to the arc having the current shown in FIG. 7 is controlled differently to obtain the advantages illustrated best in FIG. 8. The waveform at arc AC1 is in the top part of FIG. 8. It has positive portions 320 shown by current pulses 320a and negative portions 322 formed by pulses 322a. Positive portion 320 has a maximum magnitude a and width or time period b. Negative portion 322 has a maximum magnitude d and a time or period c. These four parameters are adjusted by wave shaper 240. In the illustrated embodiment, arc AC2 has the waveform shown at the bottom of FIG. 8 where positive portion 330 is formed by current pulses 330a and has a height or magnitude a' and a time length or period b'. Negative portion 332 is formed by pulses 332a and has a maximum amplitude b' and a time length c'. These parameters are adjusted by wave shaper 240. In accordance with the invention, the waveform from the wave shaper on arc AC1 is out of phase with the wave shape for arc AC2. The two waveforms have parameters or dimensions which are adjusted so that (a) penetration and deposition is controlled and (b) there is no long time during which the puddle P is subjected to a specific polarity relationship, be it a like polarity or opposite polarity. This concept in formulating the wave shapes prevents long term polarity relationships as explained by the showings in FIGS. 9 and 10. In FIG. 9 electrodes 204, 206 have like polarity, determined by the waveforms of the adjacent currents at any given time. At that instance, magnetic flux 350 of electrode 204 and magnetic flux 352 of electrode 206 are in the same direction and cancel each other at center area 354 between the electrodes. This causes the molten metal portions 360, 362 from electrodes 204, 206 in the molten puddle P to move together, as represented by arrows c. This inward movement together or collapse of the molten metal in puddle P between electrodes 204 will ultimately cause an upward gushing action, if not terminated in a very short time, i.e. less than about 20 ms. As shown in FIG. 10, the opposite movement of the puddle occurs when the electrodes 204, 206 have opposite polarities. Then, magnetic flux 370 and magnetic flux 372 are accumulated and increased in center portion 374 between the electrodes. High forces between the electrodes causes the molten metal portions 364, 366 of puddle P to retract or be forced away from each other. This is indicated by arrows r. Such outward forcing of the molten metal in puddle P causes disruption of the weld bead if it continues for a substantial time which is generally less than 10 ms. As can be seen from FIGS. 9 and 10, it is desirable to limit the time during which the polarity of the waveform at adjacent electrodes is either the same polarity or opposite polarity. The waveform, such as shown in FIG. 6, accomplishes the objective of preventing long term concurrence of specific polarity relationships, be it like polarities or opposite polarities. As shown in FIG. 8, like polarity and opposite polarity is retained for a very short time less than the cycle length of the waveforms at arc AC1 and arc AC2. This positive development of preventing long term occurrence of polarity relationships together with the novel concept of pulses having different shapes and different proportions in the positive and negative areas combine to control the puddle, control penetration and control deposition in a manner not heretofore obtainable in welding with a normal transformer power supplies or normal use of Lincoln waveform technology.

Figure 11:
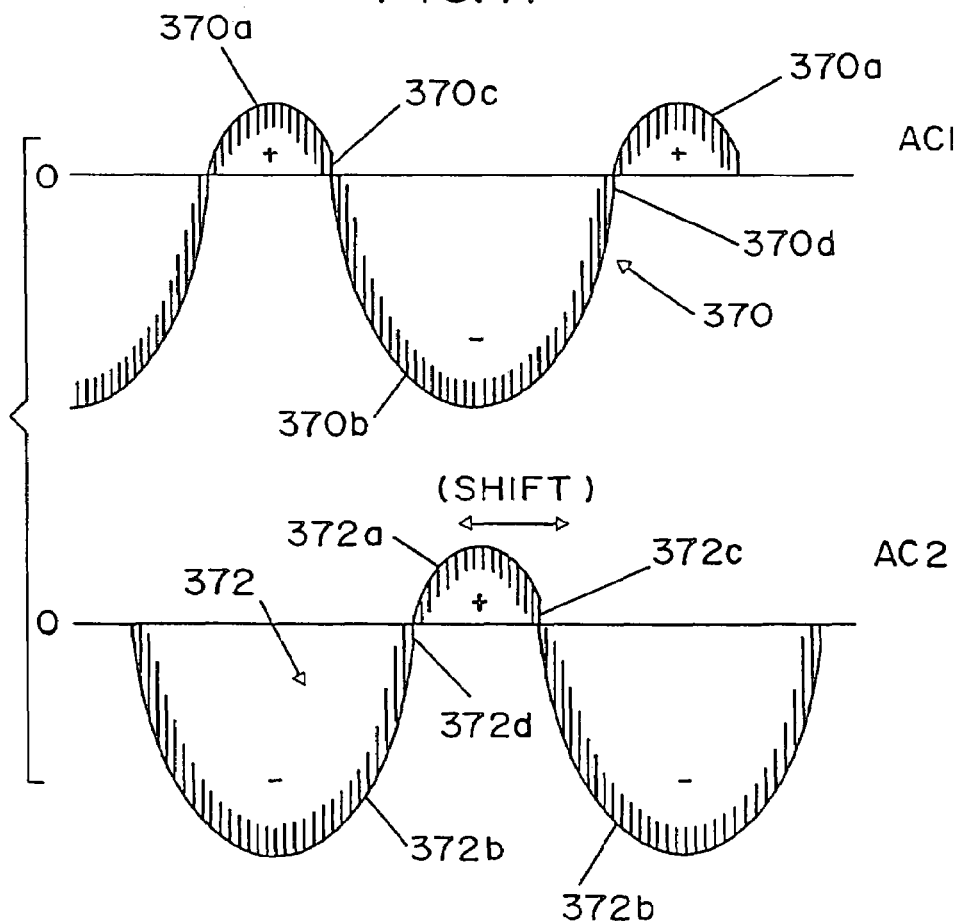
FIG. 11 is a pair of current graphs showing the waveforms on two adjacent tandem electrodes that can be generated by a background system.

In FIG. 11 the positive and negative portions of the AC waveform from the wave shaper 240 are synthesized sinusoidal shapes with a different energy in the positive portion as compared to the negative portion of the waveforms. The synthesized sine wave or sinusoidal portions of the waveforms allows the waveforms to be compatible with transformer welding circuits and compatible with evaluation of sine wave welding. In FIG. 11, waveform 370 is at arc AC1 and waveform 372 is at arc AC2. These tandem arcs utilize the AC welding current shown in FIG. 11 wherein a small positive sinusoidal portion 370a controls penetration at arc AC1 while the larger negative portion 370b controls the deposition of metal at arc AC1. There is a switching between the polarities with a change in the logic bit, as discussed in FIG. 7. Sinusoidal waveform 370 plunges vertically from approximately 100 amperes through zero current as shown in by vertical line 370c. Transition between the negative portion 370b and positive portion 370a also starts a vertical transition at the switching point causing a vertical transition 370d. In a like manner, phase shifted waveform 372 of arc AC2 has a small penetration portion 372a and a large negative deposition portion 372b. Transition between polarities is indicated by vertical lines 372c and 372d. Waveform 372 is shifted with respect to waveform 370 so that the dynamics of the puddle are controlled without excessive collapsing or repulsion of the molten metal in the puddle caused by polarities of adjacent arcs AC1, AC2. In FIG. 11, the sine wave shapes are the same and the frequencies are the same. They are merely shifted to prevent a long term occurrence of a specific polarity relationship.

Figure 12:
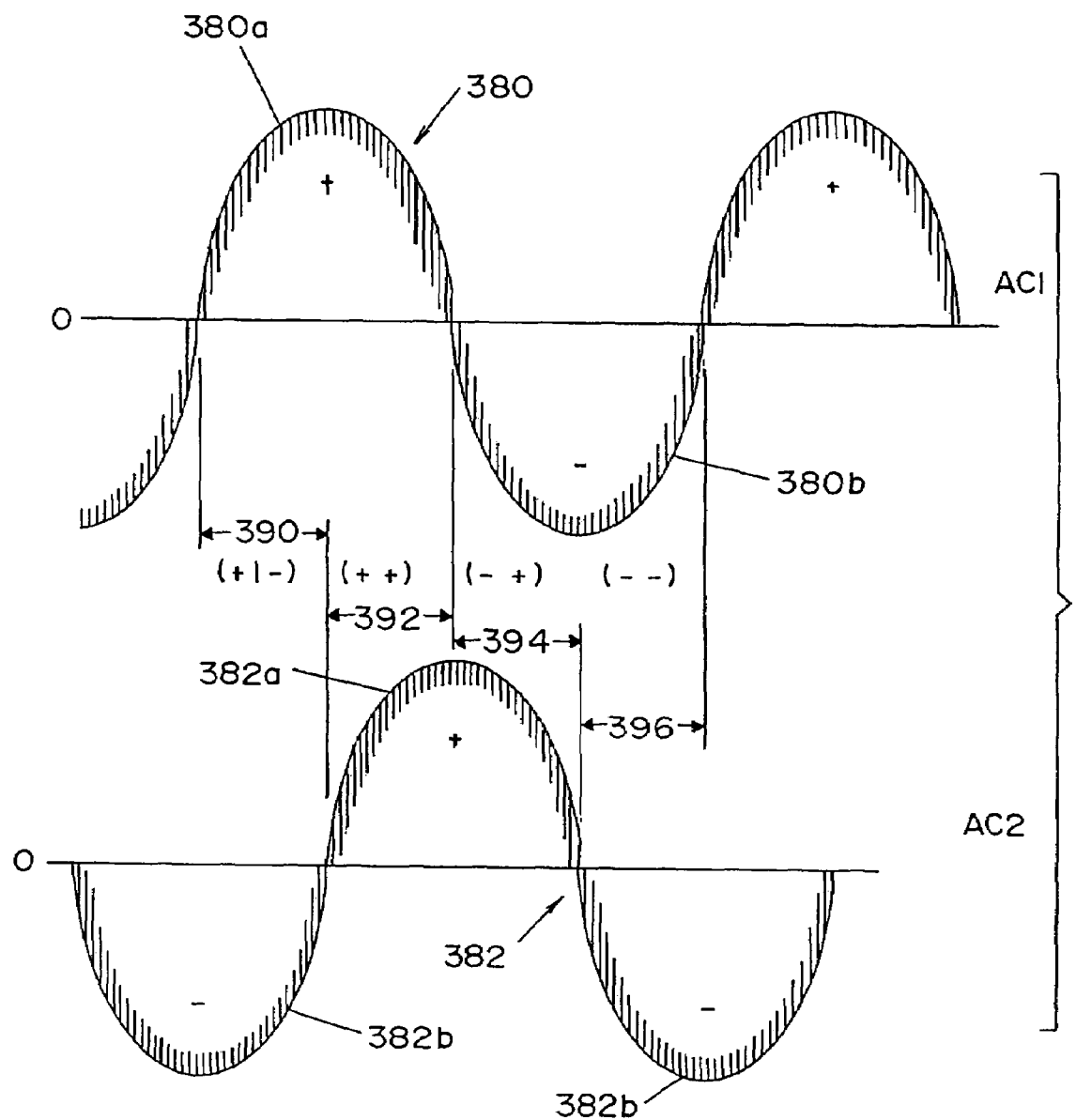
FIG. 12 is a pair of current graphs of the AC waveforms on adjacent tandem electrodes with areas of concurring polarity relationships.
Figure 13:
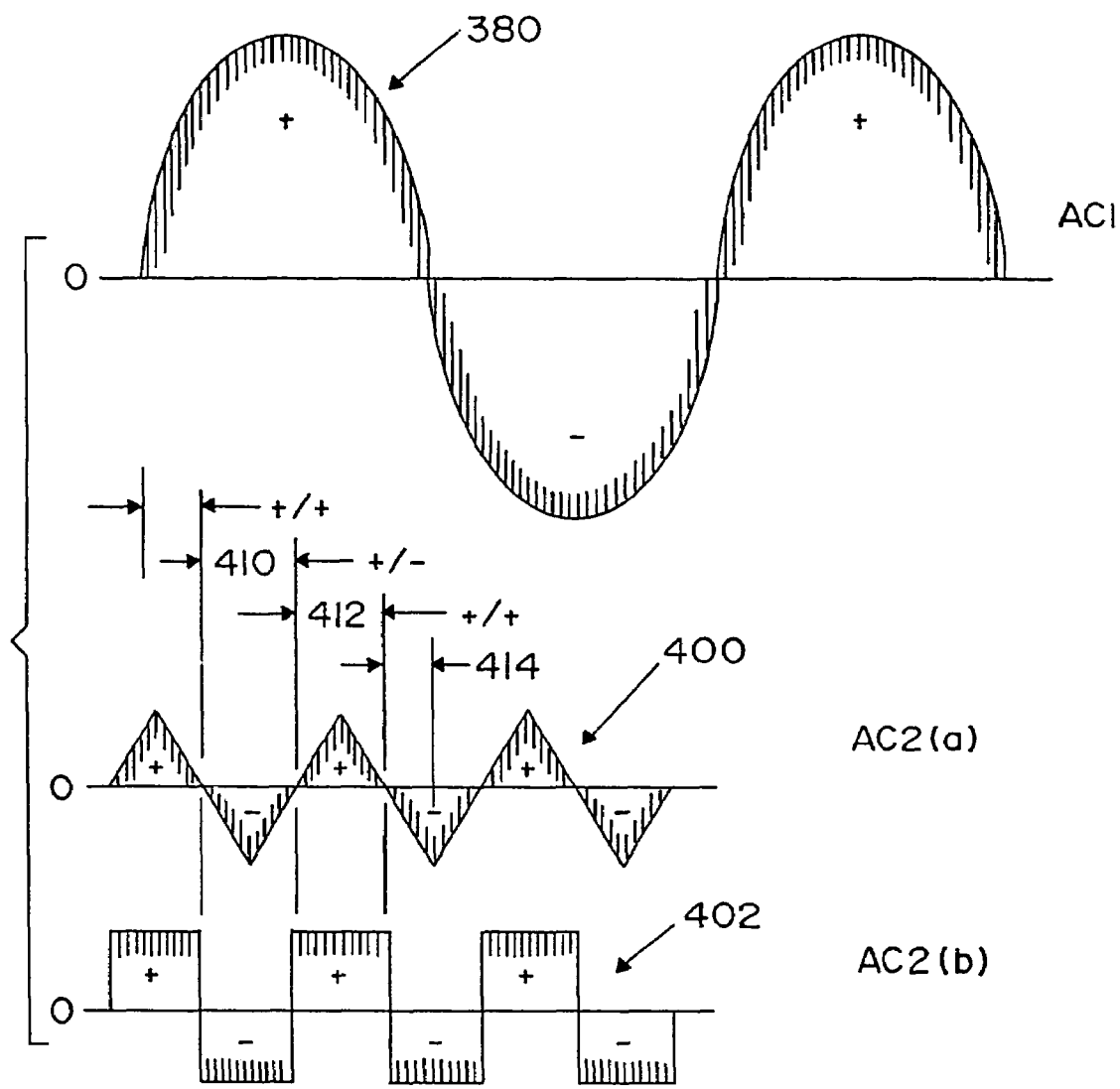
FIG. 13 are current graphs of the waveforms on adjacent tandem electrodes wherein the AC waveform of one electrode is substantially different waveform of the other electrode to limit the time of concurrent polarity relationships.
Figure 14:
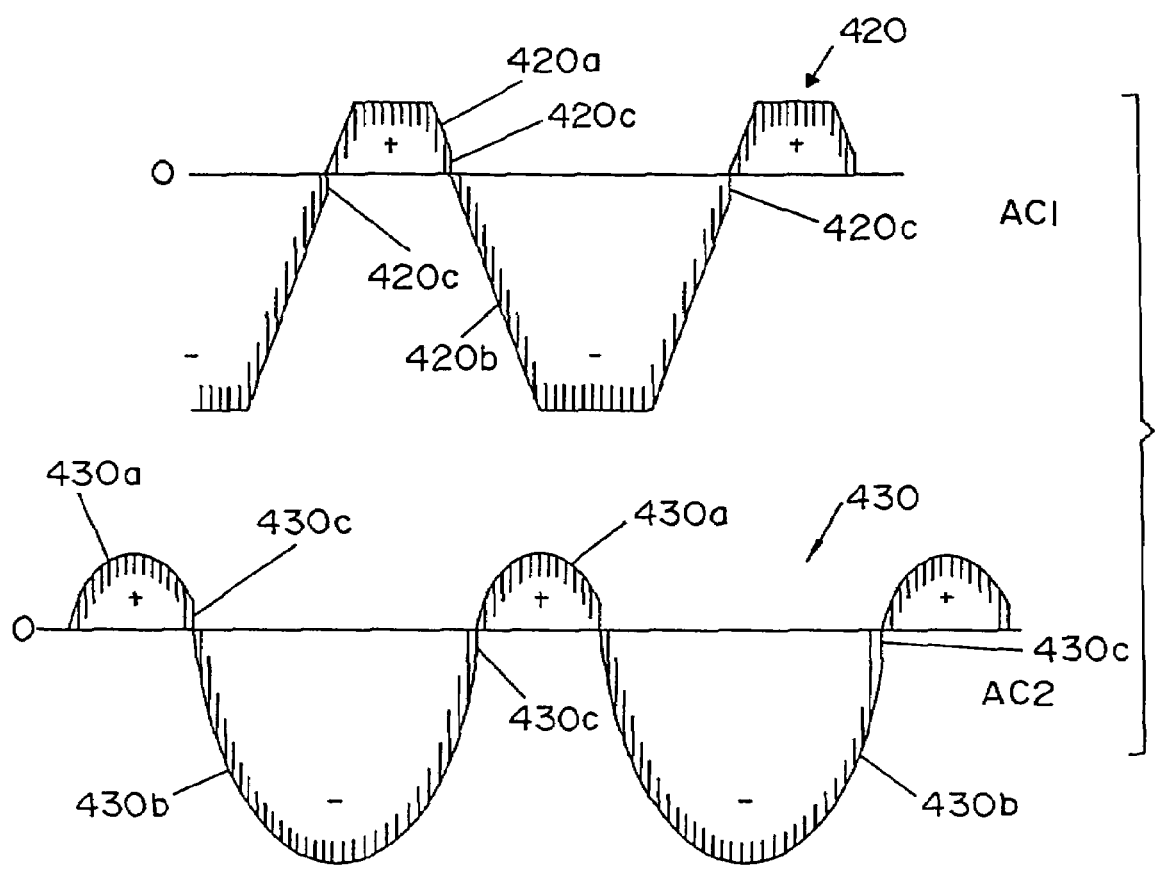
FIG. 14 are current graphs of two sinusoidal waveforms for adjacent electrodes operated by a background system to use different shaped wave forms for the adjacent electrodes.

In FIG. 12 waveform 380 is used for arc AC1 and waveform 372 is used for arc AC2. Portions 380a, 380b, 382a, and 382b are sinusoidal synthesized and are illustrated as being of the same general magnitude. By shifting these two waveforms 90°, areas of concurrent polarity are identified as areas 390, 392, 394 and 396. By using the shifted waveforms with sinusoidal profiles, like polarities or opposite polarities do not remain for any length of time. Thus, the molten metal puddle is not agitated and remains quiescent. This advantage is obtained by using the present invention which also combines the concept of a difference in energy between the positive and negative polarity portions of a given waveform. FIG. 12 is illustrative in nature to show the definition of concurrent polarity relationships and the fact that they should remain for only a short period of time. To accomplish this objective, another embodiment of the present invention is illustrated in FIG. 13 wherein previously defined waveform 380 is combined with waveform 400, shown as the sawtooth waveform of arc AC2(a) or the pulsating waveform 402 shown as the waveform for arc AC2(b). Combining waveform 380 with the different waveform 400 of a different waveform 402 produces very small areas or times of concurrent polarity relationships 410, 412, 414, etc. In FIG. 14 the AC waveform generated at one arc is drastically different than the AC waveform generated at the other arc. This same concept of drastically different waveforms for use in the present invention is illustrated in FIG. 14 wherein waveform 420 is an AC pulse profile waveform and waveform 430 is a sinusoidal profile waveform having about one-half the period of waveform 420. Waveform 420 includes a small penetration positive portion 420a and a large deposition portion 420b with straight line polarity transitions 420c. Waveform 430 includes positive portion 430a and negative portion 430b with vertical polarity transitions 430c. By having these two different waveforms, both the synthesized sinusoidal concept is employed for one electrode and there is no long term concurrent polarity relationship. Thus, the molten metal in puddle P remains somewhat quiescent during the welding operation by both arcs AC1, AC2.

In FIG. 15 waveforms 450, 452, 454 and 456 are generated by the wave shaper 240 of the power supply for each of four tandem arcs, arc AC1, arc AC2, arc AC3 and arc AC4. The adjacent arcs are aligned as indicated by synchronization signal 460 defining when the waveforms correspond and transition from the negative portion to the positive portion. This synchronization signal is created by generator 80 shown in FIG. 1, except the start pulses are aligned. In this embodiment of the invention first waveform 450 has a positive portion 450a, which is synchronized with both the positive and negative portion of the adjacent waveform 452, 454 and 456. For instance, positive portion 450a is synchronized with and correlated to positive portion 452a and negative portion 452b of waveform 452. In a like manner, the positive portion 452a of waveform 452 is synchronized with and correlated to positive portion 454a and negative portion 454b of waveform 454. The same relationship exist between positive portion 454a and the portions 456a, 456b of waveform 456. The negative portion 450b is synchronized with and correlated to the two opposite polarity portions of aligned waveform 452. The same timing relationship exist between negative portion 452b and waveform 454. In other words, in each adjacent arc one polarity portion of the waveform is correlated to a total waveform of the adjacent arc. In this manner, the collapse and repelling forces of puddle P, as discussed in connection with FIGS. 9 and 10, are dynamically controlled. One or more of the positive or negative portions can be synthesized sinusoidal waves as discussed in connection with the waveforms disclosed in FIGS. 11 and 12.

As indicated in FIGS. 1 and 2, when the master controller of switches is to switch, a switch command is issued to master controller 140a of power supply 30. This causes a "kill" signal to be received by the master so a kill signal and polarity logic is rapidly transmitted to the controller of one or more slave power supplies connected in parallel with a single electrode. If standard AC power supplies are used with large snubbers in parallel with the polarity switches, the slave controller or controllers are immediately switched within 1-10 μs after the master power supply receives the switch command. This is the advantage of the high accuracy interface cards or gateways. In practice, the actual switching for current reversal of the paralleled power supplies is not to occur until the output current is below a given value, i.e. about 100 amperes. This allows use of smaller switches.

The implementation of the switching for all power supplies for a single AC arc uses the delayed switching technique where actual switching can occur only after all power supplies are below the given low current level. The delay process is accomplished in the software of the digital processor and is illustrated by the schematic layout of FIG. 16. When the controller of master power supply 500 receives a command signal as represented by line 502, the power supply starts the switching sequence. The master outputs a logic on line 504 to provide the desired polarity for switching of the slaves to correspond with polarity switching of the master. In the commanded switch sequence, the inverter of master power supply 500 is turned off or down so current to electrode E is decreased as read by hall effect transducer 510. The switch command in line 502 causes an immediate "kill" signal as represented by line 512 to the controllers of paralleled slave power supplies 520, 522 providing current to junction 530 as measured by hall effect transducers 532, 534. All power supplies are in the switch sequence with inverters turned off or down. Software comparator circuits 550, 552, 554 compare the decreased current to a given low current referenced by the voltage on line 556. As each power supply decreases below the given value, a signal appears in lines 560, 562, and 564 to the input of a sample and hold circuits 570, 572, and 574, respectively. The circuits are outputted by a strobe signal in line 580 from each of the power supplies. When a set logic is stored in a circuit 570, 572, and 574, a YES logic appears on lines READY[1], READY[2], and READY[3] at the time of the strobe signal. This signal is generated in the power supplies and has a period of 25 μs; however, other high speed strobes could be used. The signals are directed to controller C of the master power supply, shown in dashed lines in FIG. 8. A software ANDing function represented by AND gate 580 has a YES logic output on line 582 when all power supplies are ready to switch polarity. This output condition is directed to clock enable terminal ECLK of software flip flop 600 having its D terminal provided with the desired logic of the polarity to be switched as appearing on line 504. An oscillator or timer operated at about 1 MHz clocks flip flop by a signal on line 602 to terminal CK. This transfers the polarity command logic on line 504 to a Q terminal 604 to provide this logic in line 610 to switch slaves 520, 522 at the same time the identical logic on line 612 switches master power supply 500. After switching, the polarity logic on line 504 shifts to the opposite polarity while master power supply awaits the next switch command based upon the switching frequency. Other circuits can be used to effect the delay in the switching sequence; however, the illustration in FIG. 16 is the present scheme.

As so far described in FIGS. 1-16, the welder, and control system for the welder to accomplish other advantageous features is submitted as background information. This description explains the background, not prior art, to the present invention. This background technology has been developed by The Lincoln Electric Company, assignee of the present application. This background description is not necessarily prior art, but is submitted for explanation of the specific improvement in such waveform technology welders, as accomplished by the present invention shown in FIGS. 17 AND 18.

The welder and/or welding system as shown in FIGS. 4 and 5, is operated by control program 700 constructed in accordance with the present invention. Program 700 is illustrated in FIG. 17, where welder W has a wave shaper 240 set to a general type of weld waveform by a select network 250. The selected waveform is the desired AC waveform to perform, by a succession of waveforms, a given welding process. In accordance with the invention, waveform control program 700 has a profile control network 710 to set the desired general profile of the waveform and a magnitude control circuit 712 to adjust the energy or power of the waveform without substantially changing the set profile.

In accordance with the invention, the program or control network 700 is connected to the wave shaper 240 to control the exact general profile of each individual waveform in the succession of waveforms constituting an AC welding process. To accomplish this objective of accurate and precise synergistic setting of the waveform general profile, four separate profile parameters are adjusted individually. The first parameter is frequency set into the waveform profile by circuit 720 manually or automatically adjusted by interface network 722 to produce a set value on an output represented as line 724. This value controls the set frequency of the waveform profile. Of course, this is actually the period of the waveform. In a like manner, the duty cycle of the waveform is controlled by circuit 730 having an adjustable interface network 732 and an output line 734 for developing a value to control the relationship between the positive half cycle and the negative half cycle. This profile parameter is set by the logic or data on line 754 from circuit 730. By the signal or data on line 724 and the data on line 734, the AC profile of the waveform is set. This does not relate to the energy level of the individual portions of the waveform, but merely the general fixed profile of the waveform. To control the up ramp rate of the waveform there is provided a circuit 742 having a manual or automatic adjusting network 742 and an output signal on line 744 for setting the rate at which the set profile of the waveform changes from negative to a positive polarity. In a like manner, a down ramp circuit 750 is provided with an adjusting interface 752 and an output line 754. The magnitudes of the values on lines 724, 734, 744 and 754 set the general profile of the individual waveform. In accordance with the invention, at least two of these parameter profiles are set together; however, preferably all of the profile parameters are set to define a general waveform profile.

To control the general profile of the waveform for the purposes of the energy or power transmitted by each individual waveform in the welding process, the present invention includes magnitude circuit or network 712 divided into two individual sections 760, 762. These sections of the magnitude circuit control the energy or other power related level of the waveform during each of the polarities without substantially affecting the general profile set by profile control network 710. In accordance with the illustrated embodiment of the invention, section 760 includes a level control circuit 770 which is manually adjusted by an interface network 772 to control the relationship between an input value on line 774 and an output value on line 776. Level control circuit 770 is essentially a digital error amplifier circuit for controlling the current, voltage and/or power during the positive portion of the generated set waveform profile. Selector 250a shifts circuit 770 into either the current, voltage or power mode. Section 760 controls the energy, or power or other heat level during the positive portion of the waveform with changing the general profile set by network 710. In a like manner, second section 762 has a digital error amplifier circuit 760 that is set or adjusted by network 782 so that the value on input line 784 controls the level or signal on output line 786. Consequently, the digital level data on lines 776 and 786 controls the current, voltage and/or power during each of the half cycles set by profile control network 710.

In accordance with another aspect of the invention, wave shaper 240 is controlled by only magnitude control circuit 712 and the profile is set by network or program 250 used in the background system shown in FIGS. 4 and 5. Network 250 does not set the general profile, but selects known types of waveforms. The enhanced advantage of the present invention is realized by setting all profile parameters using circuits 720, 730, 740 and 750 together with the magnitude circuits 770, 780. Of course, a waveform controlled by any one of these circuits is an improvement over the background technology. The invention is a synergistic control of all of the profile parameters and magnitude values during each polarity of the AC waveform.

To explain the operation of the invention two waveforms are schematically illustrated in FIG. 18. Waveform 800 has a positive portion 802 and a negative portion 804, both produced by a series of rapidly created current pulses 800a. Waveform 800 is illustrated as merely a square wave to illustrate control of the frequency or period of the waveform and the ratio of the positive portion 802 to the negative portion 804. These parameters are accurately set by using the invention to modify the type of waveform heretofore merely selected by network 450. In this schematic representation of the waveform, the up ramp rate and the down ramp rate are essentially zero. Of course, the switching concept taught in Stava U.S. Pat. No. 6,111,216 would be employed for shifting between positive and negative waveform portions to obtain the advantages described in the Stava patent. Second illustrated waveform 810 has a frequency f, a positive portion 812 and a negative portion 814. In this illustration, the up ramp rate 816 is controlled independently of the down ramp rate 818. These ramp rates are illustrated as arrows to indicate they exist at the leading and trailing edges of the waveform during shifts between polarities. The present invention relates to setting the exact profile of the individual waveforms by circuits 720, 730, 740 and 750. The invention involves setting several parameters to essentially "paint" the waveform into a desired general profile. A very precise welding process using a set general profile for the AC waveform is performed by a waveform technology controlled welder using the present invention.

Having thus defined the invention, the following is claimed:

1. An electric arc welder for creating a succession of AC waveforms between an electrode and workpiece, the electric arc welder comprising:
    a profile control network including at least one of a frequency setting circuit, a duty cycle setting circuit, an up-ramp rate setting circuit, or a down-ramp rate setting circuit, the profile control network configured to establish a general profile of individual waveforms in the succession of AC waveforms, by setting more than one profile parameter for each of the individual waveforms, said parameters selected from a class consisting of at least one of frequency, duty cycle, up-ramp rate and down-ramp rate, the parameters being set by selective use of the at least one of the frequency setting circuit, the duty cycle setting circuit, the up-ramp rate setting circuit or the down-ramp rate setting circuit, wherein each of the profile parameters are individually settable with respect to each of the other ones of the profile parameters;
    a magnitude control circuit configured to set total current, voltage and/or power of each of the individual waveforms without substantially affecting the general fixed profile;
    a wave shaper configured to selectively receive inputs from the profile control network and the magnitude control network to generate an exact profile for each of the individual waveforms;
    a polarity signal generator configured to receive an input from the wave shaper and to generate a polarity signal which determines a polarity of any portion of each of the individual waveforms; and
    a high frequency switching circuit configured to receive an input from the wave shaper and to generate each of the individual waveforms at a frequency of at least 18 kHz.

2. An electric arc welder according to claim 1, wherein the electric arc welder is configured for use in a tandem welding process.

3. An electric arc welder according to claim 1, wherein the profile parameters are configured to be settable in a real time basis during a welding operation.

4. An electric arc welder according to claim 1, wherein the profile is configured to be maintained irrespective of the total current, voltage and/or power set by the magnitude network.

5. A method of electric arc welding by creating a succession of AC waveforms between an electrode and workpiece by a power source comprising a high frequency switching device for creating individual waveforms in said succession of waveforms, each of said individual waveforms having a profile determined by the magnitude of each of a large number of short current pulses generated at a frequency of at least 18 kHz with the profile of the current pulses controlled by a wave shaper, said method comprising:
    determining the polarity of any portion of each of the individual waveforms by a polarity signal generated by a polarity generating circuit;
    establishing the profile of each of the individual waveforms by individually setting more than one profile parameter for each of the individual waveforms, said parameters selected from the class consisting of at least one of frequency, duty cycle, up-ramp rate and down-ramp rate; and
    adjusting the voltage and/or power of each of the individual waveforms by a magnitude setting circuit.

6. A method according to claim 5, further including operating the electric arc welder in a tandem welding process.

7. A method according to claim 5, further including configuring the profile parameters in real time during a welding operation.

8. A method according to claim 5, further including maintaining the profile irrespective of the total current, voltage and/or power set by the magnitude setting circuit.

9. A method as defined in claim 5 including:
    adjusting the magnitude of at least one of the individual waveforms during a positive polarity time period; and,
    adjusting the magnitude of the at least one of the individual waveforms during a negative polarity time period.

10. A method as defined in claim 9 including:
    selecting current, voltage or power for magnitude control during the positive polarity time period.

11. A method as defined in claim 9, including:
    selecting current, voltage or power for magnitude control during the negative polarity time period.

12. An electric arc welder for creating a succession of AC waveforms between an electrode and a workpiece by a power source comprising:
    a high frequency switching device for creating individual waveforms in said succession of waveforms, each of said individual waveforms having a profile determined by the magnitude of each of a large number of short current pulses generated at a frequency of at least 18 kHz by a pulse width modulator;
    a wave shaper to control a magnitude of the current pulse;
    a polarity signal generator to generate a polarity signal which determines a polarity of any portion of each of said individual waveforms determined by the data of a polarity signal;
    a profile control network to control a general profile of said individual waveforms, said profile control network controlling more than one profile parameter of an individual waveform profile, said profile parameters selected from a class consisting of freguency, duty cycle, up-ramp rate and down-ramp rate; and
    a magnitude circuit for adjusting each of the individual waveforms to a set condition of current, voltage or power.

13. An electric arc welder according to claim 12, wherein the electric arc welder is configured for use in a tandem welding process.

14. An electric arc welder according to claim 12, wherein profile parameters are configured to be settable in a real time basis during a welding operation.

15. An electric arc welder according to claim 12, wherein the profile is configured to be maintained irrespective of set total current, voltage and/or power.

16. An electric arc welder as defined in claim 12 wherein said magnitude circuit includes an input selector to set said magnitude circuit to a desired polarity.

17. An electric arc welder as defined in claim 16 including a profile control network to control the general profile of said individual waveform.

18. An electric arc welder as defined in claim 12 including a profile control network to control the general profile of said individual waveform.

19. An electric arc welder for creating a succession of AC waveforms between an electrode and a workpiece by a power source comprising:
- a high frequency switching device for creating individual waveforms in the succession of waveforms, each of the individual waveforms having a profile determined by the magnitude of each of a large number of short current pulses generated by a pulse width modulator;
- a wave shaper to control a magnitude of the current pulse;
- a polarity signal generator to generate a polarity signal which determines a polarity of any portion of each of the individual waveforms determined by data of a polarity signal;
- a profile control network to control the profile of the individual waveform, the profile control network controlling more than one profile parameter of an individual waveform profile, and the profile parameters selected from a class consisting of frequency, duty cycle, up-ramp rate and down-ramp rate; and
- a magnitude circuit for adjusting each of the individual waveforms to a set condition of current, voltage or power, said magnitude circuit including an input selector to set said magnitude circuit to a desired polarity.

20. An electric arc welder for creating a succession of AC waveforms between an electrode and a workpiece by a power source comprising:
- a high frequency switching device for creating individual waveforms in said succession of waveforms, each of said individual waveforms having a profile determined by the magnitude of each of a large number of short current pulses generated by a pulse width modulator;
- a wave shaper to control a magnitude of the current pulse;
- a polarity signal generator to generate a polarity signal which determines a polarity of any portion of each of the individual waveforms determined by data of a polarity signal;
- a profile control network to control a general profile of said individual waveform, said profile control network controlling more than one profile parameter of an individual waveform profile, said profile parameters selected from a class consisting of frequency, duty cycle, up-ramp rate and down-ramp rate; and
- a magnitude circuit for adjusting each of the individual waveforms to a set condition of current, voltage or power.

* * * * *